US012696199B2

(12) United States Patent
Su et al.

(10) Patent No.: US 12,696,199 B2
(45) Date of Patent: Jul. 28, 2026

(54) UL POWER CONTROL FOR TRANSPORT BLOCK TRANSMISSION OVER MULTIPLE SLOTS

(71) Applicant: TELEFONAKTIEBOLAGET LM ERICSSON (PUBL), Stockholm (SE)

(72) Inventors: Ling Su, Beijing (CN); Zhipeng Lin, Nanjing (CN); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 345 days.

(21) Appl. No.: 18/285,471

(22) PCT Filed: Apr. 4, 2022

(86) PCT No.: PCT/IB2022/053132
§ 371 (c)(1),
(2) Date: Oct. 3, 2023

(87) PCT Pub. No.: WO2022/208490
PCT Pub. Date: Oct. 6, 2022

(65) Prior Publication Data
US 2024/0188001 A1 Jun. 6, 2024

(30) Foreign Application Priority Data

Apr. 3, 2021 (WO) ................ PCT/CN2021/085475
Apr. 6, 2021 (WO) ................ PCT/CN2021/085712

(51) Int. Cl.
*H04W 52/34* (2009.01)
*H04W 52/14* (2009.01)

(52) U.S. Cl.
CPC ....... *H04W 52/346* (2013.01); *H04W 52/146* (2013.01)

(58) Field of Classification Search
CPC ............. H04W 52/146; H04W 52/242; H04W 52/325; H04W 72/23; H04W 72/21; H04W 52/365; H04W 72/0473; H04W 52/34; H04W 52/367; H04W 52/281; H04W 72/0446; H04W 52/50; H04W 52/54; H04W 52/16; H04W 80/02; H04W 52/40; H04W 52/58; H04W 52/346; H04W 72/1268; H04W 52/42; H04W 72/04;

(Continued)

(56) References Cited

U.S. PATENT DOCUMENTS 12,464,537 B2 * 11/2025 Matsumura ........... H04W 16/28
2021/0068062 A1 * 3/2021 Yang ................... H04L 27/2602

(Continued)

OTHER PUBLICATIONS

Qualcomm Incorporated, "Solution to KI#7: Mobility between 5G MBS supporting and 5G MBS non-supporting NG RAN nodes", SA WG2 Meeting #139E, S2-2004223, Electronic meeting, Jun. 1-12, 2020.

(Continued)

*Primary Examiner* — Golam Sorowar

(57) ABSTRACT

Systems and methods are disclosed herein for uplink power control for Transport Block (TB) over Multiple Slots (TBoMS). In one embodiment, a method performed by a wireless communication device comprises determining transmit power for a TBoMS uplink transmission per TBoMS transmission occasion and transmitting the TBoMS uplink transmission. In this manner, power control for TBoMS is provided.

21 Claims, 10 Drawing Sheets

| D | D | S | U | U | D | D | S | U | U |

PUSCH OCCASION #1
(I.E., TBoMS TRANSMISSION OCCASION #1)

PUSCH OCCASION #2
(I.E., TBoMS TRANSMISSION OCCASION #2)

(a) Two PUSCH Occasions

| D | D | S | U | U | D | D | S | U | U |

PUSCH OCCASION #1
(I.E., TBoMS TRANSMISSION OCCASION #1)

(b) One PUSCH Occasions

(58) Field of Classification Search
CPC ..... H04W 88/02; H04W 52/08; H04W 52/14;
H04W 72/56; H04W 72/12; H04W 72/20;
H04W 76/15; H04W 76/20; H04W 52/24
See application file for complete search history.

(56) References Cited

U.S. PATENT DOCUMENTS

| | | | | |
|---|---|---|---|---|
| 2022/0225322 | A1* | 7/2022 | Shim | H04L 1/1858 |
| 2022/0303983 | A1* | 9/2022 | Ly | H04L 1/0009 |
| 2024/0137937 | A1* | 4/2024 | Matsumura | H04W 24/08 |
| 2024/0155502 | A1* | 5/2024 | Lin | H04W 52/36 |
| 2024/0214947 | A1* | 6/2024 | Park | H04L 5/0053 |
| 2024/0397451 | A1* | 11/2024 | Gao | H04W 52/04 |

OTHER PUBLICATIONS

Samsung, "Alignment CR for TS 38.213", 3GPP TSG-RAN WG1 Meeting #103-e, R1-2009742, e-Meeting, Oct. 26-Nov. 13, 2020.
Samsung, "Joint channel estimation for PUSCH", 3GPP TSG RAN WG1 #104-e, R1-2101223, e-Meeting, Jan. 25-Feb. 5, 2021.
3GPP TS 36.331 V16.3.0, "3rd Generation Partnership Project; Technical Specification Group Radio Access Network; Evolved Universal Terrestrial Radio Access (E-UTRA); Radio Resource Control (RRC); Protocol specification (Release 16)", Dec. 2020.
3GPP TS 38.211 V16.5.0, "3rd Generation Partnership Project; Technical Specification Group Radio Access Network; NR; Physical channels and modulation (Release 16)", Mar. 2021.
3GPP TS 38.213 V16.4.0, "3rd Generation Partnership Project; Technical Specification Group Radio Access Network; NR; Physical layer procedures for control (Release 16)", Dec. 2020.
3GPP TS 38.213 V16.5.0, "3rd Generation Partnership Project; Technical Specification Group Radio Access Network; NR; Physical layer procedures for control (Release 16)", Mar. 2021.
3GPP TS 38.214 V16.5.0, "3rd Generation Partnership Project; Technical Specification Group Radio Access Network; NR; Physical layer procedures for data (Release 16)", Mar. 2021.
3GPP TS 38.215 V16.4.0, "3rd Generation Partnership Project; Technical Specification Group Radio Access Network; NR; Physical layer measurements (Release 16)", Dec. 2020.
3GPP TS 38.321 V16.4.0, "3rd Generation Partnership Project; Technical Specification Group Radio Access Network; NR; Medium Access Control (MAC) protocol specification", Mar. 2021.
3GPP TS 38.331 V16.4.1, "3rd Generation Partnership Project; Technical Specification Group Radio Access Network; NR; Radio Resource Control (RRC) protocol specification (Release 16)", Mar. 2021.
Vivo, "Discussion on PUSCH TB processing over multiple slots", 3GPP TSG RAN WG1 #104-e, R1-2100458, e-Meeting, Jan. 25-Feb. 5, 2021.
ZTE Corporation, "Discussion on TB processing over multi-slot PUSCH", 3GPP TSG RAN WG1 #104-e, R1-2100096, e-Meeting, Jan. 28-Feb. 5, 2021.

* cited by examiner

UL POWER CONTROL FOR TRANSPORT BLOCK TRANSMISSION OVER MULTIPLE SLOTS

RELATED APPLICATIONS

This application is a national phase application of International Patent Application No. PCT/IB2022/053132, filed Apr. 4, 2022, which claims the benefit of provisional patent application serial number PCT/CN2021/085475, filed Apr. 3, 2021, and of provisional patent application serial number PCT/CN2021/085712, filed Apr. 6, 2021, the disclosures of which are hereby incorporated herein by reference in their entirety.

TECHNICAL FIELD

The present disclosure relates to uplink power control in a cellular communications system.

BACKGROUND

Uplink Power Control

As defined in Third Generation Partnership Project (3GPP) Technical Specification (TS) 38.213 v16.4.0:
  A PUSCH/PUCCH/SRS/PRACH transmission occasion i is defined by a slot index $$n_{s,f}^{\mu}$$

within a frame with system frame number SFN, a first symbol S within the slot, and a number of consecutive symbols L.
  Physical Uplink Shared Channel (PUSCH) power control in New Radio (NR) Release 16 has been specified as shown in the following excerpt from section 7.1 of 3GPP TS 38.213 v16.4.0:

\*\*\*\*\*\*\*\*\*\*Start Excerpt from 3GPP TS 38.213 v16.3.0\*\*\*\*\*\*\*\*\*\*

If a UE transmits a PUSCH on active UL BWP b of carrier f of serving cell C using parameter set configuration with index j and PUSCH power control adjustment state with index l, the UE determines the PUSCH transmission power $P_{PUSCH,b,f,c}(i, j, q_d, l)$ in PUSCH transmission occasion i as $$P_{PUSCH,b,f,c}(i, j, q_d, l) =$$

$$\min \begin{cases} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot PL_{b,f,c}(q_d) + \\ \Delta_{TF,b,f,c}(i) + f_{b,f,c}(i, l) \end{cases} [dBm]$$

where,
  $P_{CMAX,f,c}(i)$ is the UE configured maximum output power defined in [8-1, TS 38.101-1], [8-2, TS38.101-2] and [8-3, TS38.101-3] for carrier f of serving cell C in PUSCH transmission occasion i.
  $P_{O\_PUSCH,b,f,c}(j)$ is a parameter composed of the sum of a component $P_{O\_NOMINAL\_PUSCH,f,c}(J)$ and a component $P_{O\_PUSCH,f,c}(J)$ where $j \in \{0, 1 \dots J-1\}$.
  If a UE established dedicated RRC connection using a Type-1 random access procedure, as described in Clause 8, and is not provided P0-PUSCH-AlphaSet or for a PUSCH (re)transmission corresponding to a RAR UL grant as described in Clause 8.3, $j=0$, $P_{O\_UE\_PUSCH,f,c}(0)=0$, and $P_{O\_NOMINAL\_PUSCH,fc}(0)=P_{O\_PRE}+\Delta_{PREAMBLE\_Msg3}$, where $P_{O\_PRE}$ is provided by preambleReceivedTargetPower [11, TS 38.321] and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of serving cell C
  If a UE established dedicated RRC connection using a Type-2 random access procedure, as described in Clause 8, and is not provided P0-PUSCH-AlphaSet, or for a PUSCH transmission for Type-2 random access procedure as described in Clause 8.1A, $j=0$, $P_{O\_UE\_PUSCH,f,c}(0)=0$, and
  $P_{O\_NOMINAL\_PUSCH,f,c}(0)=P_{O\_PRE}+\Delta_{MsgA\_PUSCH}$, where $P_{O\_PRE}$ is provided by msgA-preambleReceivedTargetPower, or by preambleReceivedTargetPower if msgA-preambleReceivedTargetPower is not provided and $\Delta_{MsgA\_PUSCH}$ is provided by msgA-DeltaPreamble, or $\Delta_{MsgA\_PUSCH}=\Delta_{PREAMBLE\_Msg3}$ dB if msgA-DeltaPreamble is not provided, for carrier f of serving cell c
  For a PUSCH (re)transmission configured by ConfiguredGrantConfig, $j=1$, $P_{O\_NOMINAL\_PUSCH,f,c}(1)$ is provided by p0-NominalWithoutGrant, or $P_{O\_NOMINAL\_PUSCH,f,c}(1)=P_{O\_NOMINAL\_PUSCH,f,c}(0)$ if p0-NominalWithoutGrant is not provided, and $P_{O\_UE\_PUSCH,b,f,c}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of serving cell C
  For $j \in \{2, \dots, J-1\}=S_j$, a $P_{O\_NOMINAL\_PUSCH,f,c}(j)$ value, applicable for all $j \in S_j$, is provided by p0-NominalWithGrant, or $P_{O\_NOMINAL\_PUSCH,f,c}(j)=P_{O\_NOMINAL\_PUSCH,f,c}(0)$ if p0-NominalWithGrant is not provided, for each carrier f of serving cell C and a set of $P_{O\_UE\_PUSCH,b,f,c}(j)$ values are provided by a set of p0 in P0-PUSCH-AlphaSet indicated by a respective set of p0-PUSCH-AlphaSetId for active UL BWP b of carrier f of serving cell C
  If the UE is provided by SRI-PUSCH-PowerControl more than one values of p0-PUSCH-AlphaSetId and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the value of $P_{O\_UE\_PUSCH,f,c}(j)$ from the p0-PUSCH-AlphaSetId value that is mapped to the SRI field value. If the DCI format also includes an open-loop power control parameter set indication field and a value of the open-loop power control parameter set indication field is '1', the UE determines a value of $P_{O\_UE\_PUSCH,f,c}(j)$ from a first value in P0-PUSCH-Set with a p0-PUSCH-SetId value mapped to the SRI field value.

If the PUSCH transmission except for the PUSCH retransmission corresponding to a RAR UL grant is scheduled by a DCI format that does not include an SRI field, or if SRI-PUSCH-PowerControl is not provided to the UE, j=2, If P0-PUSCH-Set is provided to the UE and the DCI format includes an open-loop power control parameter set indication field, the UE determines a value of $P_{O\_UE\_PUSCH,b,f,c}(j)$ from a first P0-PUSCH-AlphaSet in p0-AlphaSets if a value of the open-loop power control parameter set indication field is '0' or '00' a first value in P0-PUSCH-Set with the lowest p0-PUSCH-SetID value if a value of the open-loop power control parameter set indication field is '1' or '01' a second value in P0-PUSCH-Set with the lowest p0-PUSCH-SetID value if a value of the open-loop power control parameter set indication field is '10' else, the UE determines $P_{O\_UE\_PUSCH,f,c}(j)$ from the value of the first P0-PUSCH-AlphaSet in p0-AlphaSets For $\alpha_{b,f,c}(j)$ For j=0, if $P_{O\_NOMINALPUSCH,f,c}(0){=}P_{O\_PRE}{+}\Delta_{MsgA\_PUSCH}$ and msgA-Alpha is provided, $\alpha_{b,f,c}(0)$ is the value of msgA-Alpha elseif $P_{O\_NOMINALPUSCH,f,c}(0){=}P_{O\_PRE}{+}\Delta_{PREAMBLE\_Msg3}$ or msgA-Alpha is not provided, and msg3-Alpha is provided, $\alpha_{b,f,c}(0)$ is the value of msg3-Alpha else, $\alpha_{b,f,c}(0){=}1$ For j=1, $\alpha_{b,f,c}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of serving cell C For $j{\in}S_J$, a set of $\alpha_{b,f,c}(j)$ values are provided by a set of alpha in P0-PUSCH-AlphaSet indicated by a respective set of p0-PUSCH-AlphaSetId for active UL BWP b of carrier f of serving cell C If the UE is provided SRI-PUSCH-PowerControl and more than one values of p0-PUSCH-AlphaSetId, and if a DCI format scheduling the PUSCH transmission includes an SRI field, the UE obtains a mapping from sri-PUSCH-PowerControlId in SRI-PUSCH-PowerControl between a set of values for the SRI field in the DCI format [5, TS 38.212] and a set of indexes provided by p0-PUSCH-AlphaSetId that map to a set of P0-PUSCH-AlphaSet values and determines the values of $\alpha_{b,f,c}(j)$ from the p0-PUSCH-AlphaSetId value that is mapped to the SRI field value If the PUSCH transmission except for the PUSCH retransmission corresponding to a RAR UL grant is scheduled by a DCI format that does not include an SRI field, or if SRI-PUSCH-PowerControl is not provided to the UE, j=2, and the UE determines $\alpha_{b,f,c}(j)$ from the value of the first P0-PUSCH-AlphaSet in p0-AlphaSets $$M_{RB,b,f,c}^{PUSCH}(i)$$

is the bandwidth of the PUSCH resource assignment expressed in number of resource blocks for PUSCH transmission occasion i on active UL BWP b of carrier f of serving cell C and µ is a SCS configuration defined in [4, TS 38.211]

$PL_{b,f,c}(q_d)$ is a downlink pathloss estimate in dB calculated by the UE using reference signal (RS) index $q_d$ for the active DL BWP, as described in Clause 12, of carrier f of serving cell c If the UE is not provided PUSCH-PathlossReferenceRS and enableDefaultBeamPL-ForSRS, or before the UE is provided dedicated higher layer parameters, the UE calculates $PL_{b,f,c}(q_d)$ using a RS resource from an SS/PBCH block with same SS/PBCH block index as the one the UE uses to obtain MIB If the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS If the PUSCH transmission is scheduled by a RAR UL grant as described in Clause 8.3, or for a PUSCH transmission for Type-2 random access procedure as described in Clause 8.1A, the UE uses the same RS resource index $q_d$ as for a corresponding PRACH transmission If the UE is provided SRI-PUSCH-PowerControl and more than one values of PUSCH-PathlossReferenceRS-Id, the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values and determines the RS resource index $q_d$ from the value of PUSCH-PathlossReferenceRS-Id that is mapped to the SRI field value where the RS resource is either on serving cell c or, if provided, on a serving cell indicated by a value of pathlossReferenceLinking the PUSCH transmission is scheduled by DCI format 0_0, and if the UE is provided a spatial setting by PUCCH-SpatialRelationInfo for a PUCCH resource with a lowest index for active UL BWP b of each carrier f and serving cell c, as described in Clause 9.2.2, the UE uses the same RS resource index $q_d$ as for a PUCCH transmission in the PUCCH resource with the lowest index If the PUSCH transmission is not scheduled by DCI format 0_0, and if the UE is provided enableDefaultBeamPL-ForSRS and is not provided PUSCH-PathlossReferenceRS and PUSCH-PathlossReferenceRS-r16. the UE uses the same RS resource index $q_d$ as for an SRS resource set with an SRS resource associated with the PUSCH transmission If the PUSCH transmission is scheduled by DCI format 0_0 and the UE is not provided a spatial setting for a PUCCH transmission, or the PUSCH transmission is scheduled by DCI format 0_1 or DCI format 0_2 that does not include an SRI field, or SRI-PUSCH-PowerControl is not provided to the UE, the UE determines a RS resource index $q_d$ with a respective PUSCH-PathlossReferenceRS-Id value being equal to zero where the RS resource is either on serving cell c or, if provided, on a serving cell indicated by a value of pathlossReference Linking If the PUSCH transmission is scheduled by DCI format 0_0 on serving cell c, the UE is not provided PUCCH resources for the active UL BWP of serving cell c, and the UE is provided enableDefaultBeamPL-For-PUSCH0-0 the UE determines a RS resource index $q_d$ providing a periodic RS resource configured with qel-Type set to 'typeD' in the TCI state or the QCL assumption of a CORESET with the lowest index in the active DL BWP of the serving cell c If the PUSCH transmission is scheduled by DCI format 0_0 on serving cell c, the UE is not provided a spatial setting for PUCCH resources on the active UL BWP of the primary cell [11, TS 38.321], and the UE is provided enableDefaultBeamPL-For-PUSCH0-0 the UE determines a RS resource index $q_d$ providing a periodic RS resource configured with qel-Type set to 'typeD' in the TCI state or the QCL assumption of a CORESET with the lowest index in the active DL BWP of the serving cell c For a PUSCH transmission configured by Config-uredGrantConfig, if rrc-ConfiguredUplinkGrant is included in ConfiguredGrantConfig, a RS resource index $q_d$ is provided by a value of pathlossReferen-ceIndex included in rre-ConfiguredUplinkGrant where the RS resource is either on serving cell C or, if provided, on a serving cell indicated by a value of pathlossReferenceLinking For a PUSCH transmission configured by Config-uredGrantConfig that does not include rre-Configure-dUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include an SRI field, the UE determines a RS resource index $q_d$ with a respective PUSCH-PathlossReferenceRS-Id value being equal to zero where the RS resource is either on serving cell C or, if provided, on a serving cell indicated by a value of pathlossReferenceLinking If the UE is provided enablePL-RS-UpdateForPUSCH-SRS, a mapping between sri-PUSCH-PowerControlId and PUSCH-PathlossReferenceRS-Id values can be updated by a MAC CE as described in [11, TS38.321]

For a PUSCH transmission scheduled by a DCI format that does not include an SRI field, or for a PUSCH transmission configured by ConfiguredGrantConfig and activated, as described in Clause 10.2, by a DCI format that does not include an SRI field, a RS resource index $q_d q_d$ is determined from the PUSCH-Pathloss-ReferenceRS-Id mapped to sri-PUSCH-PowerCon-trolId=0

$PL_{b,f,c}(q_d)$=referenceSignalPower−higher layer filtered RSRP, where referenceSignalPower is provided by higher layers and RSRP is defined in [7, TS 38.215] for the reference serving cell and the higher layer filter configuration provided by QuantityConfig is defined in [12, TS 38.331] for the reference serving cell If the UE is not configured periodic CSI-RS reception, referenceSignalPower is provided by ss-PBCH-Block-Power. If the UE is configured periodic CSI-RS recep-tion, referenceSignalPower is provided either by ss-PBCH-BlockPower or by powerControlOffsetSS providing an offset of the CSI-RS transmission power relative to the SS/PBCH block transmission power [6, TS 38.214]. If powerControlOffsetSS is not provided to the UE, the UE assumes an offset of 0 dB.

$$\Delta_{TF,b,f,c}(i) = 10\log_{10}\left(\left(2^{BPRE K_s} - 1\right)\cdot\beta_{offset}^{PUSCH}\right)$$

for $K_S$=1.25 and $\Delta_{TF,b,f,c}(i)$=0 for $K_S$=0 where $K_S$ is provided by deltaMCS for each UL BWP b of each carrier f and serving cell C. If the PUSCH transmission is over more than one layer [6, TS 38.214], $\Delta_{TF,b,f,c}(i)$ =0. BPRE and $$\beta_{offset}^{PUSCH},$$

for active UL BWP b of each carrier f and each serving cell C, are computed as below $$BPRE = \sum_{r=0}^{C-1} K_r / N_{RE}$$

for PUSCH with UL-SCH data and $$BPRE = Q_m \cdot R / \beta_{offset}^{PUSCH}$$

for CSI transmission in a PUSCH without UL-SCH data, where

C is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i,j),$$

where $$N_{symb,b,f,c}^{PUSCH}(i)$$

is a number of symbols for PUSCH transmission occasion i on active UL BWP b of carrier f of serving cell C, $$N_{sc,data}^{RB}(i, j)$$

is a number of subcarriers excluding DM-RS subcarriers and phase-tracking RS samples [4, TS 38.211] in PUSCH symbol j and assuming no segmentation for a nominal repetition in case the PUSCH transmission is with repetition Type B, $$0 \le j < N_{symb,b,f,c}^{PUSCH}(i),$$

and C, $K_r$ are defined in [5, TS 38.212]

$$\beta_{offset}^{PUSCH} = 1$$

when the PUSCH includes UL-SCH data and $$\beta_{offset}^{PUSCH} = \beta_{offset}^{CSI,1},$$

as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data For the PUSCH power control adjustment state $f_{b,f,c}(i,l)$ for active UL BWP b of carrier f of serving cell C in PUSCH transmission occasion i $\delta_{PUSCH,b,f,c}(i,l)$ is a TPC command value included in a DCI format that schedules the PUSCH transmission occasion i on active UL BWP b of carrier f of serving cell C or jointly coded with other TPC commands in a DCI format 2_2 with CRC scrambled by TPC-PUSCH-RNTI, as described in Clause 11.3

$l \in \{0,1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of $l \in \{0,1\}$ is provided to the UE by powerControlLoopToUse If the UE is provided SRI-PUSCH-PowerControl, the UE obtains a mapping between a set of values for the SRI field in a DCI format scheduling the PUSCH transmission and the/value(s) provided by sri-PUSCH-ClosedLoopIndex and determines the/value that is mapped to the SRI field value If the PUSCH transmission is scheduled by a DCI format that does not include an SRI field, or if an SRI-PUSCH-PowerControl is not provided to the UE, l=0

If the UE obtains one TPC command from a DCI format 2_2 with CRC scrambled by a TPC-PUSCH-RNTI, the l value is provided by the closed loop indicator field in DCI format 2_2

$$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state/for active UL BWP b of carrier f of serving cell C and PUSCH transmission occasion i if the UE is not provided tpc-Accumulation, where The $\delta_{PUSCH,b,f,c}$ values are given in Table 7.1.1-1

$$\sum_{m=0}^{C(D_i)-1} \delta_{PUSCH,b,f,c}(m, l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$, and $K_{PUSCH}(i)$ symbols before PUSCH transmission occasion i on active UL BWP b of carrier f of serving cell C for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i If a PUSCH transmission is scheduled by a DCI format, $K_{PUSCH}(i)$ is a number of symbols for active UL BWP b of carrier f of serving cell C after a last symbol of a corresponding PDCCH reception and before a first symbol of the PUSCH transmission If a PUSCH transmission is configured by ConfiguredGrantConfig, $K_{PUSCH}(i)$ is a number of $K_{PUSCH,min}$ symbols equal to the product of a number of symbols per slot, $$N_{symb}^{slot},$$

and the minimum of the values provided by k2 in PUSCH-ConfigCommon for active UL BWP b of carrier f of serving cell C If the UE has reached maximum power for active UL BWPb of carrier f of serving cell C at PUSCH transmission occasion $$i - i_0 \sum_{m=0}^{C(D_i)-1} \delta_{PUSCH,b,f,c}(m, l) \ge 0, \text{ then } f_{b,f,c}(i, l) = f_{b,f,c}(i - i_0, l)$$

If UE has reached minimum power for active UL BWPb of carrier f of serving cell C at PUSCH transmission occasion $$i - i_0 \text{ and } \sum_{m=0}^{C(D_i)-1} \delta_{PUSCH,b,f,c}(m, l) \le 0, \text{ then } f_{b,f,c}(i, l) = f_{b,f,c}(i - i_0, l)$$

A UE resets accumulation of a PUSCH power control adjustment state/for active UL BWP b of carrier f of serving cell C to $f_{b,f,c}(k,l)=0$, $k=0, 1 \ldots, i$ If a configuration for a corresponding $P_{O\_UE\_PUSCH,b,f,c}(j)$ value is provided by higher layers If a configuration for a corresponding $\alpha_{b,f,c}(j)$ value is provided by higher layers where l is determined from the value of j as If $j>1$ and the UE is provided higher SRI-PUSCH-PowerControl, l is the sri-PUSCH-ClosedLoopIndex value(s) configured in any SRI-PUSCH-PowerControl with the SRI-PUSCH-AlphaSetId value corresponding to j If $j>1$ and the UE is not provided SRI-PUSCH-PowerControl or $j=0$, $l=0$ If $j=1$, l is provided by the value of powerControlLoopToUse $f_{b,f,c}(i,l)=\delta_{PUSCH,b,f,c}(i,l)$ is the PUSCH power control adjustment state for active UL BWP b of carrier f of serving cell C and PUSCH transmission occasion i if the UE is provided tpc-Accumulation, where $\delta_{PUSCH,b,f,c}$ absolute values are given in Table 7.1.1-1

If the UE receives a random access response message in response to a PRACH transmission or a MsgA transmission on active UL BWP b of carrier f of serving cell C as described in Clause 8

$f_{b,f,c}(0,l)=\Delta P_{rampup,b,f,c}+\delta_{msg2,b,f,c}$, where $l=0$ and $\delta_{msg2,b,f,c}$ is a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallbackRAR, on active UL BWP b of carrier f in the serving cell C, and $$\Delta P_{rampup,b,f,c} = \\ \min\left[\left\{\max\left(0, P_{CMAX,f,c} - \begin{pmatrix} 10 \log_{10}(2^{\mu} \cdot M_{RB,b,f,c}^{PUSCH}(0)) \\ +P_{O\_PUSCH,b,f,c}(0) + \alpha_{b,f,c}(0) \cdot PL_c \\ +\Delta_{TF,b,f,c}(0) + \delta_{msg2,b,f,c} \end{pmatrix}\right)\right\}, \\ \Delta P_{rampuprequested,b,f,c}\right]$$

and $\Delta P_{rampuprequested,b,f,c}$ is provided by higher layers and corresponds to the total power ramp-up requested by higher layers from the first to the last random access preamble for carrier f in the serving cell C, $$M_{RB,b,f,c}^{PUSCH}(0)$$

is the bandwidth of the PUSCH resource assignment expressed in number of resource blocks for the first PUSCH transmission on active UL BWP b of carrier f of serving cell C, and $\Delta_{TF,b,f,c}(0)$ is the power adjustment of first PUSCH transmission on active UL BWP b of carrier f of serving cell C.

If the UE transmits the PUSCH in PUSCH transmission occasion i on active UL BWP b of carrier f of serving cell c as described in Clause 8.1A, $f_{b,f,c}(0,l)=\Delta P_{rampup,b,f,c}$, where $l = 0$, and $$\Delta P_{rampup,b,f,c} = \\ \min\left[\left\{\max\left(0, P_{CMAX,f,c} - \begin{pmatrix} 10 \log_{10}(2^{\mu} \cdot M_{RB,b,f,c}^{PUSCH}(i)) \\ +P_{O\_PUSCH,b,f,c}(0) + \alpha_{b,f,c}(0) \cdot PL_c(i) \\ +\Delta_{TF,b,f,c}(i) \end{pmatrix}\right)\right\}, \\ \Delta P_{rampuprequested,b,f,c}\right]$$

and $\Delta P_{rampuprequested,b,f,c}$ is provided by higher layers and corresponds to the total power ramp-up requested by higher layers, $$M_{RB,b,f,c}^{PUSCH}(i)$$

is the bandwidth of the PUSCH resource assignment expressed in number of resource blocks, and $\Delta_{TF,b,f,c}(i)$ is the power adjustment of the PUSCH transmission in PUSCH transmission occasion i.

\*\*\*\*\*\*\*\*\*\*End Excerpt from 3GPP TS 38.213 v16.3.0\*\*\*\*\*\*\*\*\*\*

Layer 3 Filtering

Layer 3 filtering is specified as shown in the following excerpt from 3GPP TS 38.331 v16.3.1:

\*\*\*\*\*\*\*\*\*\*Start Excerpt from 3GPP TS 38.331 v16.3.1\*\*\*\*\*\*\*\*\*\*

5.5.3.2 Layer 3 Filtering

The UE shall:

1> for each cell measurement quantity, each beam measurement quantity, each sidelink measurement quantity as needed in sub-clause 5.8.10, and for each CLI measurement quantity that the UE performs measurements according to 5.5.3.1:

[1] 2> filter the measured result, before using for evaluation of reporting criteria or for measurement reporting, by the following formula:

$$F_n=(1-a)*F_{n-1}+a*M_n$$

[2] where $M_n$ is the latest received measurement result from the physical layer;

$F_n$ is the updated filtered measurement result, that is used for evaluation of reporting criteria or for measurement reporting;

$F_{n-1}$ is the old filtered measurement result, where $F_0$ is set to $M_1$ when the first measurement result from the physical layer is received; and for MeasObjectNR, $a=1/2^{(ki/4)}$, where $k_i$ is the filter-Coefficient for the corresponding measurement quantity of the i:th QuantityConfigNR in quantityConfigNR-List, and i is indicated by quantityConfigIndex in MeasObjectNR; for other measurements, $a=1/2^{(ki/4)}$, where k is the filterCoefficient for the corresponding measurement quantity received by the quantityConfig; for UTRA-FDD, $a=1/2^{(ki/4)}$, where k is the filterCoefficient for the corresponding measurement quantity received by quantityConfigUTRA-FDD in the QuantityConfig;

[3] 2> adapt the filter such that the time characteristics of the filter are preserved at different input rates, observing that the filterCoefficient k assumes a sample rate equal to X ms; The value of X is equivalent to one intra-frequency L1 measurement period as defined in TS 38.133 assuming non-DRX operation, and depends on frequency range.

NOTE 1: If k is set to 0, no layer 3 filtering is applicable.

NOTE 2: The filtering is performed in the same domain as used for evaluation of reporting criteria or for measurement reporting, i.e., logarithmic filtering for logarithmic measurements.

NOTE 3: The filter input rate is implementation dependent, to fulfil the performance requirements set in TS 38.133 [14]. For further details about the physical layer measurements, see TS 38.133 [14].

NOTE 4: For CLI-RSSI measurement, it is up to UE implementation whether to reset filtering upon BWP switch.

. . .

FilterCoefficient

The IE FilterCoefficient specifies the measurement filtering coefficient. Value fc0 corresponds to k=0, fc1 corresponds to k=1, and so on.

FilterCoefficient Information Element

---

```
-- ASN1START
-- TAG-FILTERCOEFFICIENT-START
FilterCoefficient :: =    ENUMERATED { fc0, fc1, fc2, fc3, fc4, fc5, fc6,
fc7, fc8, fc9, fc11, fc13, fc15, fc17, fc19, spare1, ...}
-- TAG-FILTERCOEFFICIENT-STOP
-- ASN1STOP
```

---

********End Excerpt from 3GPP TS 38.331 v16.3.1********

Agreements on TBoMS in Rel-17 NR Coverage Enhancement WI

In the work item description (WID) of Release 17 NR coverage enhancement, a single Transport Block (TB) transmission over multiple slots was agreed to be specified as indicated in the following agreement:

Agreements:
Specify mechanism(s) to support TB processing over multi-slot PUSCH [RAN1]
TBS determined based on multiple slots and transmitted over multiple slots.

Some related agreements have been made in RAN1 #104 meeting:

Agreements:
Consider one or two of the following options as starting points to design time domain resource determination of TBoMS
PUSCH repetition type A like TDRA, i.e., the number of allocated symbols is the same in each slot.
PUSCH repetition type B like TDRA, i.e., the number of allocated symbols in each slot can be different Agreements:
Consecutive physical slots for UL transmission can be used for TBoMS for unpaired spectrum
To resolve in RAN1 #104b-e whether to support non-consecutive physical slots for UL transmission for TBoMS for unpaired spectrum
Consecutive physical slots for UL transmission can be used for TBoMS for paired spectrum and the SUL band
FFS if non-consecutive physical slots for UL transmission are also supported for paired spectrum and the SUL band

SUMMARY

Systems and methods are disclosed herein for uplink power control for Transport Block (TB) over Multiple Slots (TBoMS). In one embodiment, a method performed by a wireless communication device comprises determining transmit power for a TBoMS uplink transmission per TBoMS transmission occasion and transmitting the TBoMS uplink transmission in accordance with the transmit power. In this manner, power control for TBoMS is provided.

In one embodiment, the transmit power is linear transmit power. In one embodiment, the TBoMS uplink transmission is a TBoMS Physical Uplink Shared Channel (PUSCH) transmission.

In one embodiment, one TBoMS transmission occasion of the TBoMS uplink transmission is defined as part of the TBoMS uplink transmission within one slot which is defined by slot index $$n_{s,f}^{\mu}$$

within a frame with system frame number SFN, a first symbol S within the slot, and a number of consecutive symbols L of the TBoMS uplink transmission within the slot.

In one embodiment, one TBoMS transmission occasion of the TBoMS uplink transmission spans two or more consecutive slots of the TBoMS uplink transmission. In one embodiment, one TBoMS transmission occasion of the TBoMS uplink transmission is defined by an index $$n_{s,f}^{\mu}$$

of a first slot of the TBoMS transmission occasion with system frame number SFN, a first symbol S within the first slot of the TBoMS transmission occasion, and a number of consecutive symbols L of the TBoMS uplink transmission in the first slot or a number of total symbols L of the TBoMS uplink transmission in the transmission occasion.

In one embodiment, one TBoMS transmission occasion of the TBoMS uplink transmission spans two or more consecutive or non-consecutive slots of the TBoMS uplink transmission. In one embodiment, one TBoMS transmission occasion of the TBoMS uplink transmission is defined by an index $$n_{s,f}^{\mu}$$

of a first slot of the TBoMS transmission occasion with system frame number SFN, a first symbol S within the first slot, and a number of symbols L of the TBoMS uplink transmission either in the first slot or across multiple slots of the TBoMS uplink transmission.

In one embodiment, all slots for the TBoMS uplink transmission are treated as a single TBoMS transmission occasion.

In one embodiment, a set of all slots for the TBoMS uplink transmission is divided into two or more subsets, and each subset of the two or more subsets is treated as one TBoMS transmission occasion.

In one embodiment, the wireless communication device supports two or more options for how a TBoMS transmission occasion is defined, and one of the two or more options that is used by the wireless communications device when determining the transmit power for the TBoMS uplink transmission per TBoMS transmission occasion is either configured by a network node or predetermined (e.g., predefined).

In one embodiment, one TBoMS transmission occasion spans two or more slots and determining the transmit power for the TBoMS uplink transmission per TBoMS transmission occasion comprises either: determining a transmit power for a TBoMS transmission occasion that is equivalent to a transmit power determined for a first slot of the TBoMS transmission occasion, where the same transmit power is kept until an end of the TBoMS transmission occasion, or determining a transmit power for a TBoMS transmission occasion considering the two or more slots of the TBoMS transmission occasion as a whole. In one embodiment, a particular parameter is different for at least two of the two or more slots of the TBoMS transmission occasion, and determining the transmit power for the TBoMS transmission occasion comprises determining the transmit power for the TBoMS transmission occasion based on the particular parameter for a fixed one or more of the two or more slots of the TBoMS transmission occasion.

In one embodiment, whether or not a change of transmit power is allowed during the TBoMS uplink transmission is either configured by a network node or predetermined. In one embodiment, whether or not a change of transmit power is allowed between repetitions of the TBoMS uplink transmission is either configured by a network node or predetermined. In one embodiment, the transmit power is interdependent on one or more other features (e.g., cross-slot channel estimation). In one embodiment, the transmit power changes between TBoMS transmission occasions for the TBoMS uplink transmission based on one or parameters. In one embodiment, the one or more parameters comprise: (a) data-to-DMRS ratio in each slot, (b) group common TPC command, (c) reference signal, (d) pathloss estimation, PUSCH power control adjustment state, or (e) any combination of two or more of (a)-(d).

In one embodiment, a same transmit power is configured or predetermined across the multiple slots of the TBoMS uplink transmission, and the wireless communication device determines the transmit power prior to transmission based on a transmit power in a first slot and keeps the transmit power the same until an end of the TBoMS uplink transmission. In one embodiment, the wireless communication device does not expect to receive a TPC command for the TBoMS uplink transmission during the TBoMS uplink transmission; and/or if the wireless communication device receives a TPC command for the TBoMS uplink transmission during the TBoMS uplink transmission:

the wireless communication device discards the TPC command, or the wireless communication device applies the TPC command in a next transmission after the TBoMS uplink transmission; and/or the wireless communication device does not expect a respective base station to change a reference signal and its transmission power, which the wireless communication device uses to estimate downlink pathloss during the TBoMS uplink transmission; and/or the wireless communication device does not perform downlink pathloss measurement from the physical layer during the TBoMS uplink transmission; and/or the wireless communication device does not expect PUSCH power control adjustment state l to be changed by RRC or DCI signaling during the TBoMS uplink transmission.

In one embodiment, determining the transmit power for the TBoMS uplink transmission per TBoMS transmission occasion comprises calculating one or more TBoMS transmission occasion related parameters. In one embodiment, the one or more TBoMS transmission occasion related parameters comprise: (I) MCS related parameter $\Delta_{TF,b,f,c}(i)$, (II) BPRE, (III) PUSCH power control adjustment state $f_{b,f,c}(i,l)$ for active UL BWP b of carrier f of serving cell c in PUSCH transmission occasion i, or (IV) a combination of any two or more of (I)-(III). In another embodiment, the one or more TBoMS transmission occasion related parameters comprise BPRE. In one embodiment, the BPRE is BPRE for multi-slot PUSCH with UL-SCH calculated cross the multiple slots of the TBoMS as:

$$BPRE = \sum_{r=0}^{C-1} K_r / N_{RE}$$

where $N_{RE}$ is a number of resource elements across the multiple slots of a TBoMS, determined as $$N_{RE} = \sum_{i=0}^{N-1} \left( M_{RB,b,f,c}^{PUSCH}(i) \cdot \sum_{j=0}^{N_{symb,b,f,c}^{PUSCH}(i)-1} N_{sc,data}^{RB}(i,j) \right),$$

where N is the total number of transmission occasions of the TBoMS, $$N_{symb,b,f,c}^{PUSCH}(i)$$

is a number of symbols for PUSCH transmission occasion i on active UL BWP b of carrier f of serving cell c, $$N_{sc,data}^{RB}(i,j)$$

is a number of subcarriers excluding DM-RS subcarriers and phase-tracking RS samples in PUSCH symbol j, $$0 \le j < N_{symb,b,f,c}^{PUSCH}(i).$$

15

In one embodiment, the BPRE is BPRE for multi-slot PUSCH with UL-SCH calculated cross the multiple slots of the TBoMS as:

$$BPRE = \sum_{r=0}^{C-1} K_r / (N_{RE} * N)$$

where $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j), \text{ where } i = 0, N_{symb,b,f,c}^{PUSCH}(i)$$

is a number of symbols for the first transmission occasion of the TBoMS on active UL BWP b of carrier f of serving cell c, $$N_{sc,data}^{RB}(i, j)$$

is a number of subcarriers excluding DM-RS subcarriers and phase-tracking RS samples [TS 38.211] in PUSCH symbol j and assuming no segmentation for a nominal repetition in case the PUSCH transmission is with repetition Type B, $$0 \le j < N_{symb,b,f,c}^{PUSCH}(i),$$

N is the total number of transmission occasions of the TBoMS.

In one embodiment, TPC accumulation is disabled, an absolute power offset value is used for power adjustment, determining the transmit power for the TBoMS uplink transmission per TBoMS transmission occasion comprises determining the absolute power adjustment in each slot of the TBoMS uplink transmission. In one embodiment, the absolute power adjustment is determined by the latest TPC command received before: the start of the first slot for TBoMS uplink transmission, or the start of the first sched-uled symbol of the first slot for TBoMS uplink transmission, or the start of a set of symbols/slots before the first slot for the TBoMS uplink transmission.

In one embodiment, multiple TBoMS transmission occa-sions are used for power calculation for the TBoMS uplink transmission, and the absolute power adjustment for deter-mining the transmit power in one TBoMS transmission occasion is determined by the latest TPC command received before: the start of the first slot of the TBoMS transmission occasion, or the start of the first symbol of the first slot of the TBoMS transmission occasion, or the start of a set of symbols/slots before the first slot of the TBoMS transmis-sion occasion.

In one embodiment, TPC accumulation is enabled, an accumulation power offset value is used for power adjust-ment, determining the transmit power for the TBoMS uplink transmission per TBoMS transmission occasion comprises determining the accumulation power adjustment in each slot of the TBoMS uplink transmission.

In one embodiment, TPC accumulation is enabled, an accumulation power offset value is used for power adjust-ment, determining the transmit power for the TBoMS uplink transmission per TBoMS transmission occasion comprises determining the accumulation power adjustment in a TBoMS transmission occasion of the TBoMS uplink trans-mission based on a set of TPC command received between $K_{PUSCH}$ (i–i$_0$)–1 symbols before TBoMS transmission occa-sion i–i$_0$ and $K_{PUSCH}$(i) symbols before TBoMS transmis-sion occasion i on active uplink bandwidth part b of carrier f of serving cell c for PUSCH power control adjustment state l, where i$_0$>0 is the smallest integer for which $K_{PUSCH}$(i–i$_0$) symbols before PUSCH transmission occasion i–i$_0$ is earlier than $K_{PUSCH}$(i) symbols before PUSCH transmission occa-sion i. In one embodiment, if a PUSCH transmission is scheduled by a Downlink Control Information, DCI, format, $K_{PUSCH}$(i) is a number of symbols for active uplink band-width part b of carrier f of serving cell c after a last symbol of a corresponding Physical Downlink Control Channel, PDCCH, reception and before a first symbol of the first slot of the current PUSCH occasion i of TBoMS transmission.

In one embodiment, TPC accumulation is enabled, an accumulation power offset value is used for power adjust-ment, multiple TBoMS transmission occasions are used for power calculation for one TBoMS transmission, and deter-mining (300) the transmit power for the TBoMS uplink transmission per TBoMS transmission occasion comprises determining the accumulation power adjustment in a TBoMS transmission occasion of the TBoMS uplink trans-mission based on a set of TPC command received between $K_{PUSCH}$ (i–i$_0$)–1 symbols before PUSCH transmission occa-sion i–i$_0$ and $K_{PUSCH}$(i) symbols before PUSCH transmis-sion occasion i on active uplink bandwidth part b of carrier f of serving cell c for PUSCH power control adjustment state l, where i$_0$>0 is the smallest integer for which $K_{PUSCH}$(i–i$_0$) symbols before PUSCH transmission occasion i–i$_0$ is earlier than $K_{PUSCH}$(i) symbols before PUSCH transmission occa-sion i. In one embodiment, if a PUSCH transmission is scheduled by a Downlink Control Information, DCI, format, $K_{PUSCH}$(i) is a number of symbols for active uplink band-width part b of carrier f of serving cell c after a last symbol of a corresponding Physical Downlink Control Channel, PDCCH, reception and before a first symbol of the first slot of the current PUSCH occasion i of TBoMS transmission.

Corresponding embodiments of a wireless communica-tion device are also disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
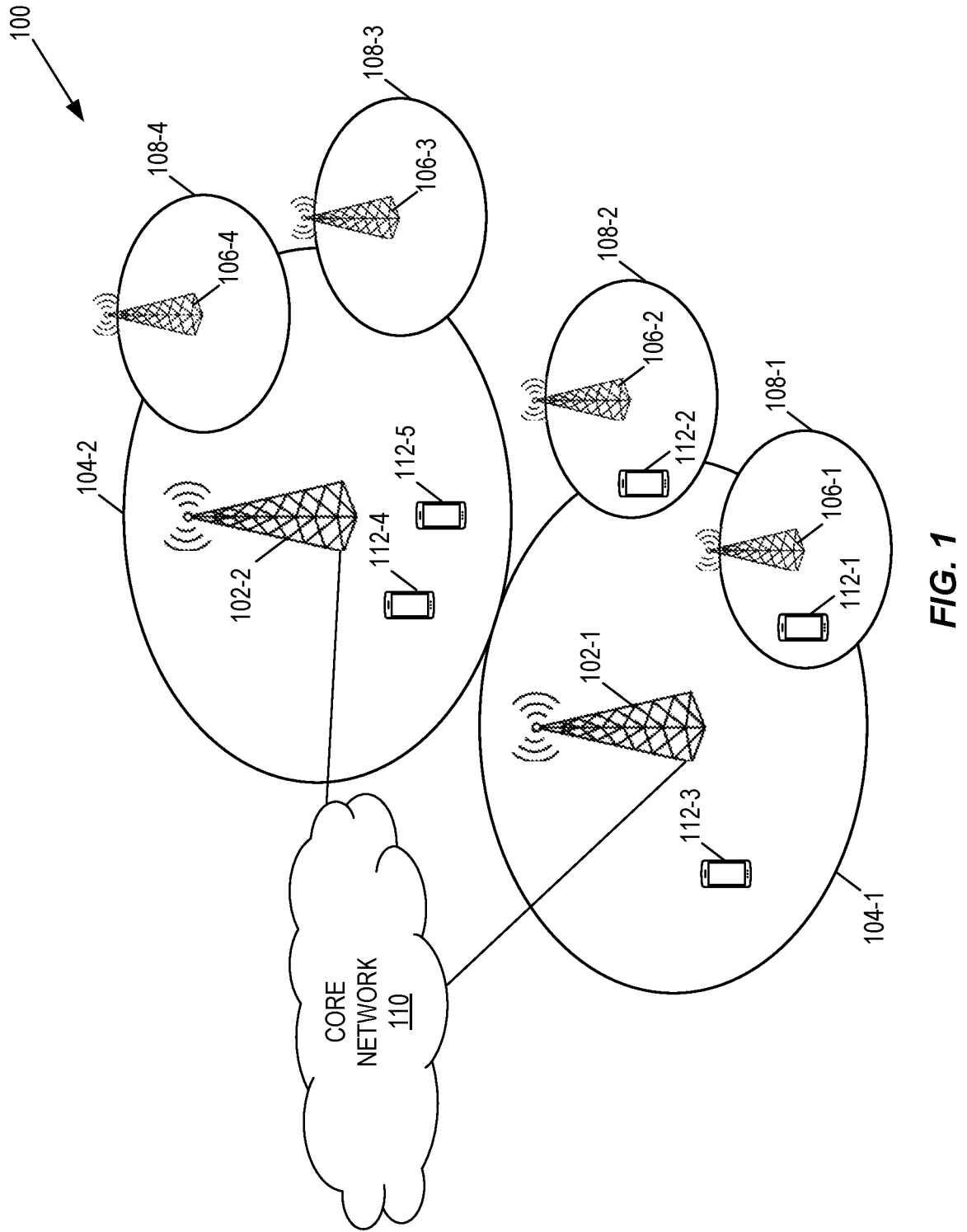
FIG. 1 illustrates one example of a cellular communica-tions system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IOT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states. In some embodiments, a TRP may a part of the gNB transmitting and receiving radio signals to/from UE according to physical layer properties and parameters inherent to that element. In some embodiments, in Multiple TRP (multi-TRP) operation, a serving cell can schedule UE from two TRPs, providing better Physical Downlink Shared Channel (PDSCH) coverage, reliability and/or data rates. There are two different operation modes for multi-TRP: single Downlink Control Information (DCI) and multi-DCI. For both modes, control of uplink and downlink operation is done by both physical layer and Medium Access Control (MAC). In single-DCI mode, UE is scheduled by the same DCI for both TRPs and in multi-DCI mode, UE is scheduled by independent DCIs from each TRP.

In some embodiments, a set Transmission Points (TPs) is a set of geographically co-located transmit antennas (e.g., an antenna array (with one or more antenna elements)) for one cell, part of one cell or one Positioning Reference Signal (PRS)-only TP. TPs can include base station (eNB) antennas, Remote Radio Heads (RRHs), a remote antenna of a base station, an antenna of a PRS-only TP, etc. One cell can be formed by one or multiple TPs. For a homogeneous deployment, each TP may correspond to one cell.

In some embodiments, a set of TRPs is a set of geographically co-located antennas (e.g., an antenna array (with one or more antenna elements)) supporting TP and/or Reception Point (RP) functionality.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenges. In NR Release 15 and Release 16, a UE determines Physical Uplink Shared Channel (PUSCH) transmission power for each transmission occasion, which refers to the scheduled uplink (UL) symbols in a slot. Release 17 Transport Block of Multiple Slots (TBoMS) has one Transport Block (TB) across multiple slots. One problem that needs to be solved is whether a transmission occasion for a TBoMS is a slot or the multiple slots of a TB. This implicitly is associated with the problem of whether the same or different transmission power can be used among the multiple slots of a TboMS.

The per-slot calculation of some power control parameters such as, e.g., Bits Per Resource Element (BPRE), is complex for TBoMS. It is complex for the UE to calculate the number of information bits in a slot for a Type-B like TBoMS. Therefore, the calculation across multiple slots and how it applies to one-slot transmission occasion is proposed.

Furthermore, Transmit Power Control (TPC) command determination for TPC accumulation needs to be specially considered, especially when multiple occasions are configured for single TBoMS transmission.

Systems and methods are disclosed herein that provide solutions to the aforementioned or other challenges. Embodiments of systems and methods are disclosed herein that relate to providing a definition of a transmission occasion for TBoMS PUSCH transmission. Embodiments of systems and methods are also disclosed herein for maintaining the same power for cross-slot channel estimation and determination of transmission occasion related power control parameters for TBoMS PUSCH transmission.

While not be limited to or by any particular advantage, embodiments of the present disclosure may provide possible definitions of a transmission occasion for uplink power control for the transmission of a TBoMS and provide a solution(s) for how to apply power control-related parameters in each slot of a TBoMS.

In this regard, FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the embodiments disclosed herein may be used in any type of wireless or cellular communications system that utilizes TBoMS. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such sometimes referred to herein as UEs 112, but the present disclosure is not limited thereto.

As has been discussed in the Background section above, in NR Release 15/16, one TB is within a slot, while NR Release 17 will support a TB over multiple slots (TBoMS, or multi-slot TB). Two types of TBoMS are being considered in 3GPP, i.e. TBoMS with Type-A like Time Domain Resource Allocation (TDRA) in each slot and TBoMS with Type-B like TDRA in each slot.

In the present disclosure, embodiments of systems and methods are disclosed that relate to providing a definition of a transmission occasion for TBoMS. In addition, embodiments of systems and method for maintaining the same power for cross-slot channel estimation, which requires the same transmission power across the multiple slots and determination of transmission occasion related power control parameters for TBoMS PUSCH transmission.

TBoMS PUSCH Transmission Occasion Definition for TBoMS PUSCH Power Calculation In NR Release 16, PUSCH transmission power is determined per PUSCH transmission occasion. A PUSCH transmission occasion i is defined by a slot index $$n_{s,f}^{\mu}$$

within a frame with system frame number SFN, a first symbol S within the slot, and a number of consecutive symbols L.

In a first embodiment, a UE 112 calculates the linear TBoMS PUSCH power per TBoMS PUSCH transmission occasion, wherein the TBoMS PUSCH transmission occasion can be determined based on one or more of the following options:

Option 1: In this option, one TBoMS PUSCH transmission occasion is defined as part of the TBoMS transmission within one slot which is defined by slot index $$n_{s,f}^{\mu}$$

within a frame with system frame number SFN, a first symbol S within the slot, and a number of consecutive symbols L of the TBoMS within the slot.

Option 2: In this option, one TBoMS PUSCH transmission occasion spans multiple consecutive slots of a TBoMS. One transmission occasion is defined by the index $$n_{s,f}^{\mu}$$

of the first slot of the transmission occasion with system frame number SFN, a first symbol S within the first slot of the transmission occasion, and a number of consecutive symbols L of the TBoMS in this slot or a number of total symbols L of the TBoMS in the transmission occasion.

Option 3: In this option, one PUSCH transmission occasion spans multiple consecutive or non-consecutive slots of a TBoMS. The transmission occasion is defined by index $$n_{s,f}^{\mu}$$

of the first slot of the transmission occasion with system frame number SFN, a first symbol S within the first slot, and a number of symbols L of the TBoMS either in this slot or across multiple slots of TBoMS.

Option 4: In this option, all the slots for a TBoMS transmission are treated as one TBoMS PUSCH transmission occasion i.

Option 5: In this option, the whole set of slots for a TBoMS transmission can be grouped into different subsets, and each subset of the slots can be treated as one TBoMS PUSCH transmission occasion.

In a sub-embodiment of the first embodiment, when multiple of the options are supported, the UE 112 can be configured by a network node (e.g., a base station 102) via, e.g., Downlink Control Information (DCI) and/or high layer signaling with one of the options to determine the definition a of PUSCH transmission occasion i for power calculation. Alternatively, one of the options to be used by the UE 112 to determine the definition a of PUSCH transmission occasion i for power calculation may be predefined or otherwise predetermined.

The options mentioned above with respect to the first embodiment, except for Option 1, allow a TBoMS transmission occasion of multiple slots. The maximum number of slots allowed per TBoMS PUSCH occasion may depend on whether non-consecutive slots are allowed in some Time Division Duplexing (TDD) configurations.

If non-consecutive slots are configured for a TBoMS, but only consecutive slots are allowed in a transmission occasion as in Option 2 above, multiple transmission occasions for a TBoMS may be needed. However, allowing non-consecutive slots to be in one PUSCH occasion makes it possible to have only one TBoMS PUSCH occasion when all slots are treated as one TBoMS PUSCH occasion as is mentioned in Option 4.

Figure 2:
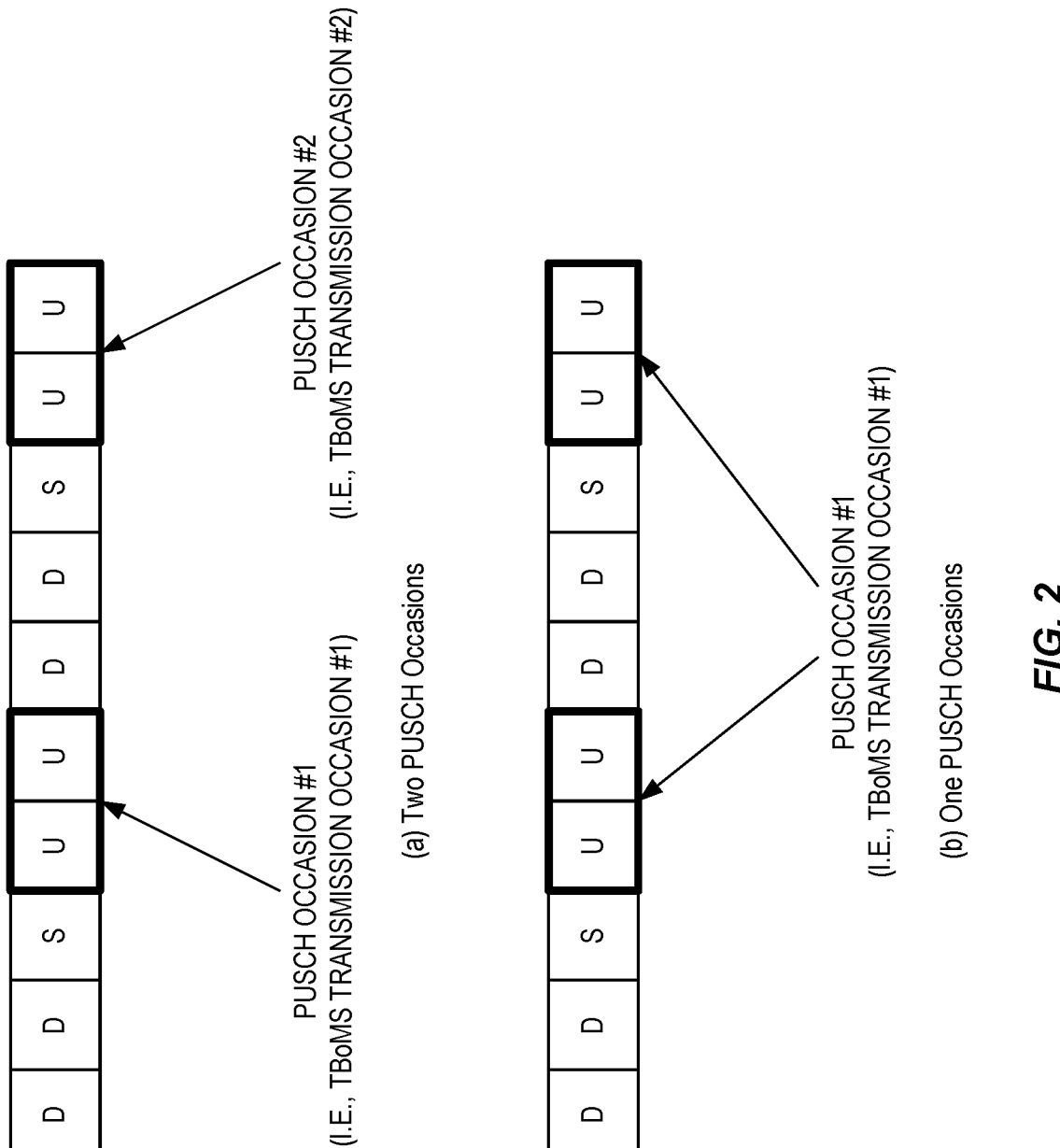
FIG. 2 illustrates examples of a TBoMS transmission occasion for an example in which a TBoMS spans over 4 uplink (UL) slots with a set of slots that are configured with a specific TDD configuration {DDSUUDDSUU}.

FIG. 2 illustrates an example in which a TBoMS spans over 4 uplink (UL) slots with a set of slots that are configured with a specific TDD configuration {DDSUUDDSUU}. In this case, if only consecutive slots are allowed for each PUSCH occasion, each TBoMS PUSCH occasion {PO1 or PO2} can have up to 2 slots as shown in FIG. 2(*a*). However, if non-consecutive uplink slots are also allowed for one PUSCH occasion, one TBoMS PUSCH occasion PO1 can have up to 4 slots as shown in FIG. 2(*b*).

In a second embodiment, if one transmission occasion of a TBoMS spans multiple slots, the UE 112 can:

Option 1: determine transmission power for the transmission occasion equivalent to the transmission power determined in the first slot of the transmission occasion and kept till the end of the transmission occasion, Option 2: determine transmission power for the multiple slots of the transmission occasion as a whole.

Option 1 and Option 2 of the second embodiment may be equal when the power control related parameters in each slot among the set of slots for this TBoMS transmission occasion are the same. But when at least one of the parameters (say parameter X) is different for each slot, in one sub-embodiment of the second embodiment, the parameter X can be determined based one or more of the following methods:

Option A: the parameter X in one or multiple fixed slots of the TBoMS PUSCH occasion is used for determining transmission power in the set of slots in this PUSCH occasion, e.g. the "one or multiple fixed slots" can be the first one or multiple slots or the last one or multiple slots of this TBoMS PUSCH occasion.

Option B: X or corresponding slots can be configured by network

One example is that the UE 112 uses Option 1 of the second embodiment for all parameters except BPRE, which is determined across multiple slots of the TB.

TBoMS PUSCH Power Control for Cross Slot Channel Estimation

A transmission occasion is the time domain granularity of UL power control. If it is within a slot, the UE 112 can adapt to power-changing factors quickly in the next slot. On the other hand, if cross-slot channel estimation is considered, the UE 112 would better keep the same transmission power in the multiple slots and have a longer transmission occasion. There are pros and cons to keep either same or different transmission power across multiple slots of a TBoMS.

It is possible that a transmission occasion of TBoMS is predetermined to reuse that of single-slot TB. Then, the UE 112 can be configured/predetermined if different transmission power is allowed for the transmission of the TBoMS. If a TBoMS spans a lot of slots, the base station 102 (e.g., gNB) can configure the number of UE transmission power changes or when the power change can happen.

In a third embodiment, the UE 112 can be configured by the network (e.g., by the base station 102) or it can be predetermined if a change of transmission power is allowed during the transmission of a TBoMS. If the UE 112 is configured with repetition of TBoMS, the UE 112 can be configured by network or it can be predetermined if a change of transmission power is allowed between the repetitions of a TBoMS. In either of these two cases, if a change of transmission power is allowed, the UE 112 can be configured with the number of power changes during the transmission or when the change of transmission power can happen.

In a sub-embodiment of the third embodiment, the same or different transmission power during the transmission of a TBoMS can be inter-dependent on other features such as, for example, cross-slot channel estimation. For example, if cross-slot channel estimation is configured for the UE 112, the UE 112 keeps the same transmission power across the slots for transmission of one or more repetitions of TBoMS for joint channel estimation. If a transmission occasion is shorter than the transmission duration of a TBoMS, the UE 112 determines UL transmission power multiple times for the transmission of a TBoMS. The possible factors which may change UL transmission power amid the multiple slots of a TB include different data-to-DMRS resource ratio in each slot, group-common TPC command, reference signal, pathloss estimation, PUSCH power control adjustment state.

In a fourth embodiment, if the same transmission power is configured/predetermined across the multiple slots of a TBoMS, the UE 112 determines the transmission power prior to the transmission based on the transmission power in the first slot and keeps the same transmission power until the end of the transmission.

In a fifth embodiment, if the same transmission power is configured/predetermined across the multiple slots of a TBoMS, one or more of the methods below can be used.

The UE 112 does not expect to receive a TPC command for the transmission of a TBoMS during the transmission of the TBoMS.

If the UE 112 receives a TPC command for the transmission of a TBoMS during the transmission of TBoMS, the UE 112 discards the TPC command, or the UE applies the TPC command in the next transmission after the TBoMS. For example, TPC accumulation command.

The UE 112 does not expect the base station 102 (e.g., gNB) to change the reference signal and its transmission power, which the UE 112 uses to estimate downlink (DL) pathloss during the transmission of TBoMS. Otherwise, the UE 112 ignores the change.

The UE 112 does not perform DL pathloss measurement from the physical layer during the transmission of TBoMS.

The UE 112 does not expect PUSCH power control adjustment state 1 to be changed by RRC or DCI signaling during the transmission of TBoMS. Otherwise, the UE 112 ignores the change.

In a sub-embodiment of the fifth embodiment, if the same transmission power is configured/predetermined across the repetitions of a TBoMS, the same methods can be used across repetitions.

Calculation of Transmission Occasion Related Power Control Parameters for TBoMS In Release 16, one transmission occasion i is within a slot and some parameters are determined per slot. If the definition of transmission occasion is to be reused for TBoMS, some parameter can be determined across multiple slots.

One parameter related to transmission occasion is the Modulation and Coding Scheme (MCS) related parameter $\Delta_{TF,b,f,c}(i)$. In Release 16, as captured in the excerpt below, for calculation of $\Delta_{TF,b,f,c}(i)$, bits per resource element (BPRE) is the number of bits transmitted by one resource element (RE) and is calculated per slot. In an alternative method, the existing definition of transmission occasion is reused for TBoMS, but BPRE can be calculated once across multiple transmission occasions of the TBoMS and applied to $\Delta_{TF,b,f,c}(i)$ in all transmission occasions.

*** Start Excerpt ***

$$\Delta_{TF,b,f,c}(i) = 10\log_{10}\left(\left(2^{BPRE \cdot K_s} - 1\right) \cdot \beta_{offset}^{PUSCH}\right),$$

$$BPRE = \sum\nolimits_{r=0}^{C-1} K_r / N_{RE}$$

for PUSCH with UL-SCH data and $$BPRE = Q_M \cdot R / \beta_{offset}^{PUSCH}$$

for CSI transmission in a PUSCH without UL-SCH data, where

C is a number of transmitted code blocks, $K_r$ is a size for code block r, and $N_{RE}$ is a number of resource elements determined as $$N_{RE} = M_{RB,b,f,c}^{PUSCH}(i) \cdot \sum\nolimits_{j=0}^{N_{symb,b,f,c}^{PUSCH}(i)-1} N_{sc,data}^{RB}(i,j), \text{ where } N_{symb,b,f,c}^{PUSCH}(i)$$

is a number of symbols for PUSCH transmission occasion i on active UL BWP b of carrier f of serving cell c, $$N_{sc,data}^{RB}(i,j)$$

is a number of subcarriers excluding DM-RS subcarriers and phase-tracking RS samples [TS 38.211] in PUSCH symbol j and assuming no segmentation for a nominal repetition in case the PUSCH transmission is with repetition Type B, $$0 \le j < N_{symb,b,f,c}^{PUSCH}(i),$$

and C, $K_r$ are defined in [TS 38.212]

*** End Excerpt ***

In a sixth embodiment, BPRE for multi-slot PUSCH with UL-SCH data can be calculated across the multiple slots of a TB, in one or more of the following ways, where bold underlined text indicates changes needed to Rel-16 BPRE calculation in 3GPP TS 38.213 rev. 16.4.0 section 7.1.1:

C is a number of transmitted code blocks across the multiple slots of a TBoMS. C=1, if there is no Code Block (CB) segmentation for TBoMS.

$K_r$ is a size for code block r across the multiple slots of a TBoMS.

$$\sum\nolimits_{r=0}^{C-1} K_r$$

is TBS of the TBOMS.

Option 1, $$BPRE = \sum\nolimits_{r=0}^{C-1} K_r / N_{RE},$$

where $N_{RE}$ is a number of resource elements across the multiple slots of a TBoMS, determined as $$N_{RE} = \sum\nolimits_{i=0}^{N-1}\left(M_{RB,b,f,c}^{PUSCH}(i) \cdot \sum\nolimits_{j=0}^{N_{symb,b,f,c}^{PUSCH}(i)-1} N_{sc,data}^{RB}(i,j)\right),$$

where N is the total number of transmission occasions of the TBoMS, N $$N_{symb,b,f,c}^{PUSCH}(i)$$

is a number of symbols for PUSCH transmission occasion i on active UL bandwidth part (BWP) b of carrier f of serving cell c, $$N_{sc,data}^{RB}(i, j)$$

is a number of subcarriers excluding Demodulation Reference Signal (DM-RS) subcarriers and phase-tracking RS samples [TS 38.211] in PUSCH symbol j, $$0 \le j < N_{symb,b,f,c}^{PUSCH}(i),$$

Option 2, $$BPRE = \sum_{r=0}^{C-1} K_r / (N_{RE} * N),$$

where
$N_{RE}$ is a number of resource elements determined as $$N_{RE} = M_{RB,b,f,c}^{PUSCH}(i).$$

$$\sum_{j=0}^{N_{symb,b,f,c}^{PUSCH}(i)-1} N_{sc,data}^{RB}(i, j), \text{ where } i = 0, N_{symb,b,f,c}^{PUSCH}(i)$$

is a number of symbols for the first transmission occasion of the TBoMS on active UL BWP b of carrier f of serving cell c, $$N_{sc,data}^{RB}(i, j)$$

is a number of subcarriers excluding DM-RS subcarriers and phase-tracking RS samples [TS 38.211] in PUSCH symbol j and assuming no segmentation for a nominal repetition in case the PUSCH transmission is with repetition Type B, $$0 \le j < N_{symb,b,f,c}^{PUSCH}(i),$$

N is the total number of transmission occasions of the TBoMS
In a sub-embodiment of the sixth embodiment, $$\Delta_{TF,b,f,c} = 10\log_{10}\left( \left(2^{BPRE \cdot K_s} - 1\right) \cdot \beta_{offset}^{PUSCH} \right) \cdot \Delta_{TF,b,f,c}$$

is the same for all transmission occasions of the TBoMS.

BPRE calculation across multiple slots instead of one slot can save the UE's effort of calculating the number of information bits in each slot. The Transport Block Size (TBS) over all slots of a TBoMS is much easier to obtain. With Option 2 of the sixth embodiment, the UE 112 only calculates $N_{RE}$ in the first transmission occasion. This can be used for Type-A like TBoMS, which has the same $N_{RE}$ in each transmission occasion. Option 1 of the sixth embodiment can be considered for Type-B like TBoMS.

Another parameter is the PUSCH power control adjustment state $f_{b,f,c}(i,l)$ for active UL BWP b of carrier f of serving cell c in PUSCH transmission occasion i, which is determined in Rel-16 according to the following excerpts from 3GPP TS 38.213 rev. 16.4.0 section 7.1.1.

*** Start Excerpt from 3GPP TS 38.213 ***

For the PUSCH power control adjustment state $f_{b,f,c}(i,l)$ for active UL BWP b of carrier f of serving cell C in PUSCH transmission occasion i $\delta_{PUSCH,b,f,c}(i,l)$ is a TPC command value included in a DCI format that schedules the PUSCH transmission occasion i on active UL BWP b of carrier f of serving cell C or jointly coded with other TPC commands in a DCI format 2_2 with CRC scrambled by TPC-PUSCH-RNTI, as described in Clause 11.3

$l \in \{0, 1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant as described in Clause 8.3

For a PUSCH (re)transmission configured by ConfiguredGrantConfig, the value of $l \in \{0,1\}$ is provided to the UE by powerControlLoopToUse If the UE is provided SRI-PUSCH-PowerControl, the UE obtains a mapping between a set of values for the SRI field in a DCI format scheduling the PUSCH transmission and the l value(s) provided by sri-PUSCH-ClosedLoopIndex and determines the l value that is mapped to the SRI field value If the PUSCH transmission is scheduled by a DCI format that does not include an SRI field, or if an SRI-PUSCH-PowerControl is not provided to the UE, l=0

If the UE obtains one TPC command from a DCI format 2_2 with CRC scrambled by a TPC-PUSCH-RNTI, the l value is provided by the closed loop indicator field in DCI format 2_2

$$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state/for active UL BWP b of carrier f of serving cell C and PUSCH transmission occasion i if the UE is not provided tpc-Accumulation, where
The $\delta_{PUSCH,b,f,c}$ values are given in Table 7.1.1-1

$$\sum_{m=0}^{C(D_i)-1} \delta_{PUSCH,b,f,c}(m, l)$$

is a sum of TPC command values in a set $D_i$ of TPC command values with cardinality $C(D_i)$ that the UE receives between $K_{PUSCH}$ $(i-i_0)-1$ symbols before PUSCH transmission occasion $i-i_0$ and $K_{PUSCH}$ (i) symbols before PUSCH transmission occasion i on active UL BWP b of carrier f of serving cell C for PUSCH power control adjustment state l, where $i_0>0$ is the smallest integer for which $K_{PUSCH}$ $(i-i_0)$ symbols before PUSCH transmission occasion $i-i_0$ is earlier than $K_{PUSCH}$ (i) symbols before PUSCH transmission occasion i If a PUSCH transmission is scheduled by a DCI format, $K_{PUSCH}$ (i) is a number of symbols for active UL BWP b of carrier f of serving cell C after a last symbol of a corresponding PDCCH reception and before a first symbol of the PUSCH transmission If a PUSCH transmission is configured by Config-uredGrantConfig, $K_{PUSCH}$ (i) is a number of $K_{PUSCH,}$ $min$ symbols equal to the product of a number of symbols per slot, $$N_{symb}^{slot},$$

and the minimum of the values provided by k2 in PUSCH-ConfigCommon for active UL BWP b of carrier f of serving cell C If the UE has reached maximum power for active UL BWPb of carrier f of serving cell C at PUSCH transmission occasion $$i - i_0 \text{ and } \sum_{m=0}^{C(D_i)-1} \delta_{PUSCH,b,f,c} (m, l) \geq 0, \text{ then } f_{b,f,c}(i, l) = f_{b,f,c}(i - i_0, l)$$

If UE has reached minimum power for active UL BWPb of carrier f of serving cell C at PUSCH transmission occasion $$i - i_0 \text{ and } \sum_{m=0}^{C(D_i)-1} \delta_{PUSCH,b,f,c} (m, l) \leq 0, \text{ then } f_{b,f,c}(i, l) = f_{b,f,c}(i - i_0, l)$$

A UE resets accumulation of a PUSCH power control adjustment state/for active UL BWP b of carrier f of serving cell C to $f_{b,f,c}(k,l)=0, k=0, 1, \ldots, i$ If a configuration for a corresponding $P_{O\_UE\_PUSCH,b,}$ $_{f,c}(j)$ value is provided by higher layers If a configuration for a corresponding $\alpha_{b,f,c}(j)$ value is provided by higher layers where/is determined from the value of j as If j>1 and the UE is provided higher SRI-PUSCH-PowerControl, l is the sri-PUSCH-ClosedLoopIndex value(s) configured in any SRI-PUSCH-PowerControl with the SRI-PUSCH-AlphaSetId value corresponding to j If j>1 and the UE is not provided SRI-PUSCH-PowerControl or j=0, l=0

If j=1, l is provided by the value of powerControlLoopToUse $f_{b,f,c}(i,l)=\delta_{PUSCH,b,f,c}(i,l)$ is the PUSCH power control adjustment state for active UL BWP b of carrier f of serving cell C and PUSCH transmission occasion i if the UE is provided tpc-Accumulation, where $\delta_{PUSCH,b,f,c}$ absolute values are given in Table 7.1.1-1

TABLE 7.1.1-1

Mapping of TPC Command Field in a DCI format scheduling a PUSCH transmission, or in DCI format 2__2 with CRC scrambled by TPC-PUSCH-RNTI, or in DCI format 2__3, to absolute and accumulated $\delta$ $_{PUSCH, b, f, c}$ values or $\delta_{SRS, b, f, c}$ Values

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

*** End Excerpt from 3GPP TS 38.213 ***

In a seventh embodiment, if the UE 112 is provided tpc-Accumulation, i.e. when the TPC accumulation is disabled, an absolute power offset value will be used for power adjustment, and one or more of the following rules may be applied to determine the power adjustment for TBoMS in each slot:

absolute power offset is determined by the latest TPC command received before the start of the first slot for TBoMS transmission or the start of the first scheduled symbol of the first slot for TBoMS transmission or the start of a set of symbols/slots before the first slot for the TBoMS transmission (when multiple TBoMS PUSCH occasions are used for power calculation for one TBoMS transmission) The absolute power offset for power calculation for the transmission in a TBoMS PUSCH occasion is determined by the latest TPC command received before the start of the first slot of the TBoMS PUSCH occasion for TBoMS transmission or the start of the first symbol of the first slot of the TBoMS PUSCH occasion for TBoMS transmission or the start of a set of symbols/slots before the first slot of the TBoMS PUSCH occasion for the TBoMS transmission In an eighth embodiment, if the UE 112 is not provided with tpc-Accumulation, i.e. when the TPC accumulation is enabled, an accumulated power offset will be used for power adjustment, one or more of the following rules may be applied to determine the power adjustment for TBoMS in each slot, where bold underlined text indicates changes to Rel-16 $K_{PUSCH}$ calculation in 3GPP TS 38.213 rev. 16.4.0 section 7.1.1:

The accumulated power offsets are determined by the sets of TPC command received between $K_{PUSCH}(i-i_0)-1$ symbols before PUSCH transmission occasion $i-i_0$ and $K_{PUSCH}(i)$ symbols before PUSCH transmission occasion i on active UL BWP b of carrier f of serving cell c for PUSCH power control adjustment state l, where i>0 is the smallest integer for which $K_{PUSCH}(i-i_0)$ symbols before PUSCH transmission occasion $i-i_0$ is earlier than $K_{PUSCH}(i)$ symbols before PUSCH transmission occasion i If a PUSCH transmission is scheduled by a DCI format, $K_{PUSCH}(i)$ is a number of symbols for active UL BWP b of carrier f of serving cell c after a last symbol of a corresponding PDCCH reception and before a first symbol of the first slot of TBoMS transmission If a PUSCH transmission is configured by Config-
uredGrantConfig, $K_{PUSCH}$ (i) is a number of
$K_{PUSCH,min}$ symbols equal to the product of a num-
ber of symbols per slot, $$N_{symb}^{slot},$$

and the minimum of the values provided by k2 in PUSCH-
ConfigCommon for active UL BWP b of carrier f of serving
cell c (when multiple TBoMS PUSCH occasions are used for
      power calculation for one TBoMS transmission) The
      accumulated power offsets are determined by the sets
      of TPC command received between $K_{PUSCH}(i-i_0)-1$ symbols before PUSCH transmission
          occasion $i-i_0$ and $K_{PUSCH}$ (i) symbols before
          PUSCH transmission occasion i on active UL BWP
          b of carrier f of serving cell c for PUSCH power
          control adjustment state 1, where $i_0>0$ is the smallest
          integer for which $K_{PUSCH}(i-i_0)$ symbols before
          PUSCH transmission occasion $i-i_0$ is earlier than
          $K_{PUSCH}$ (i) symbols before PUSCH transmission
          occasion i If a PUSCH transmission is scheduled by a DCI format,
      $K_{pusch}$ (i) is a number of symbols for active UL BWP
      b of carrier f of serving cell c after a last symbol of
      a corresponding PDCCH reception and before a first
      symbol of the first slot of the current PUSCH occa-
      sion i of TBoMS transmission If a PUSCH transmission is configured by Config-
      uredGrantConfig, $K_{PUSCH}$ (i) is a number of $K_{PUSCH,min}$ symbols equal to the product of a number of
      symbols per slot, $$N_{symb}^{slot},$$

and the minimum of the values provided by k2 in PUSCH-
ConfigCommon for active UL BWP b of carrier f of serving
cell c

Additional Description

Figure 3:
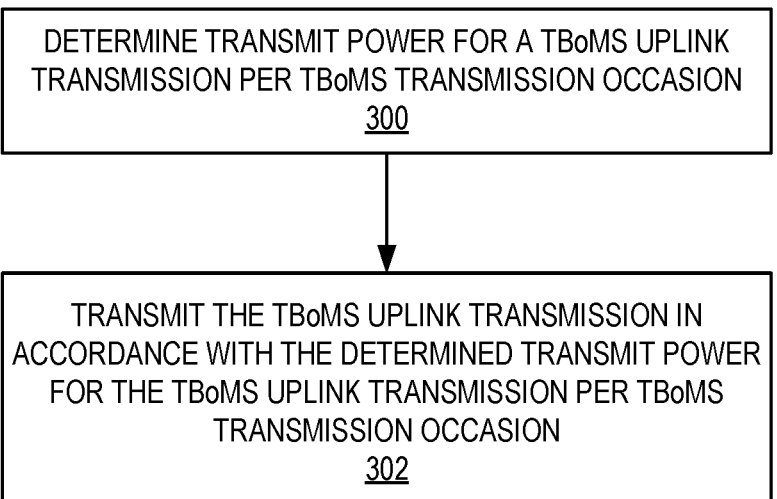
FIG. 3 is a flow chart that illustrates the operation of a wireless communication device (e.g., a User Equipment device (UE)) in accordance with embodiments of the present disclosure.

FIG. 3 is a flow chart that illustrates the operation of a
wireless communication device 112 (e.g., a UE) in accor-
dance with at least some of the embodiments described
above. As illustrated, the wireless communication device
112 determines a transmit power for a TBoMS uplink
transmission per TBoMS transmission occasion (step 300).
The transmit power may be determined using any of the first,
second, third, fourth, fifth, sixth, seventh, and/or eighth
embodiments and/or any of their sub-embodiments. The
details of these embodiments and their sub-embodiments are
described above and therefore not repeated here. However,
it should be understood that all of the details provided above
are equally applicable here to step 300. The wireless com-
munication device 112 then transmits the TBoMS uplink
transmission in accordance with the determined transmit
power for the TBoMS uplink transmission per TBoMS
transmission occasion (step 302).

Figure 4:
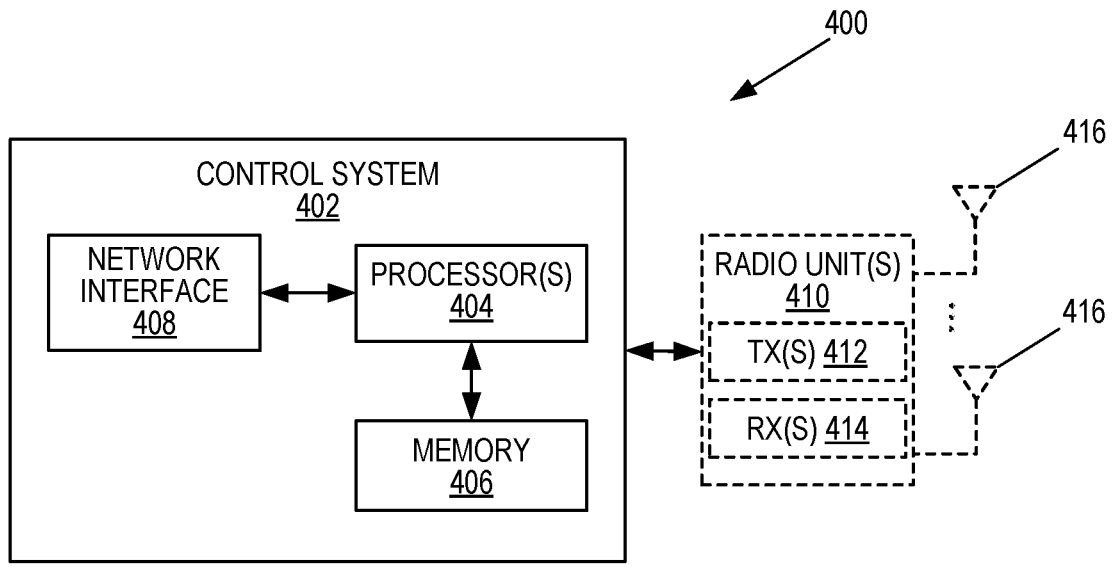
FIGS. 4, 5, and 6 are schematic block diagrams of a network node according to some embodiments of the present disclosure.

FIG. 4 is a schematic block diagram of a network node
400 according to some embodiments of the present disclo-
sure. Optional features are represented by dashed boxes. The
network node 400 may be, for example, a base station 102 or 106 or a network node that implements all or part of the
functionality of the base station 102 or gNB described
herein. As illustrated, the network node 400 includes a
control system 402 that includes one or more processors 404
(e.g., Central Processing Units (CPUs), Application Specific
Integrated Circuits (ASICs), Field Programmable Gate
Arrays (FPGAs), and/or the like), memory 406, and a
network interface 408. The one or more processors 404 are
also referred to herein as processing circuitry. In addition, if
the network node 400 is a radio access node (e.g., a base
station 102, gNB, or network node that implements at least
some of the functionality of the base station 102 or gNB), the
network node 400 may include one or more radio units 410
that each includes one or more transmitters 412 and one or
more receivers 414 coupled to one or more antennas 416.
The radio units 410 may be referred to or be part of radio
interface circuitry. In some embodiments, the radio unit(s)
410 is external to the control system 402 and connected to
the control system 402 via, e.g., a wired connection (e.g., an
optical cable). However, in some other embodiments, the
radio unit(s) 410 and potentially the antenna(s) 416 are
integrated together with the control system 402. The one or
more processors 404 operate to provide one or more func-
tions of the network node 400 as described herein (e.g., one
or more functions of a base station 102 or gNB described
herein). In some embodiments, the function(s) are imple-
mented in software that is stored, e.g., in the memory 406
and executed by the one or more processors 404.

Figure 5:
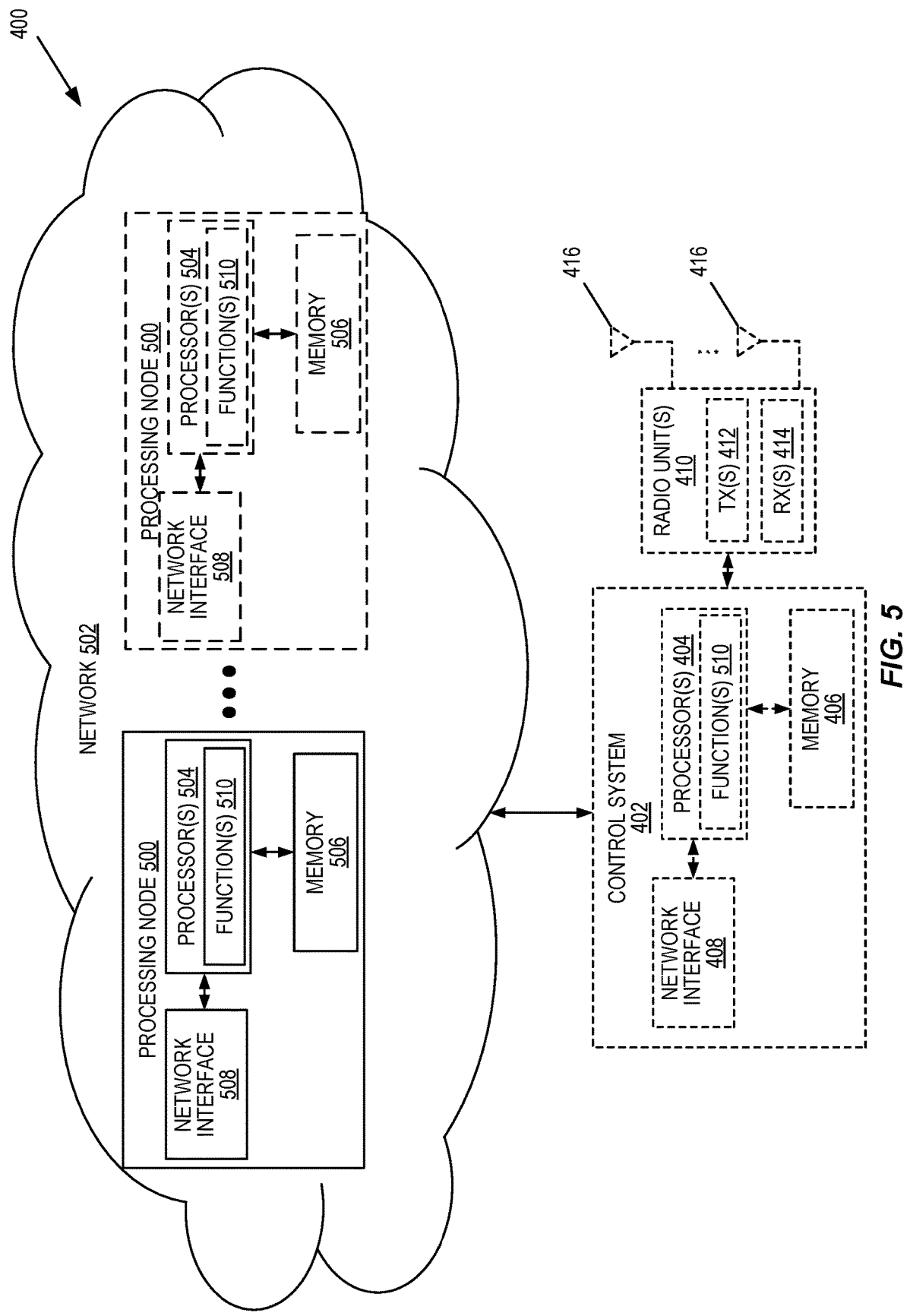

FIG. 5 is a schematic block diagram that illustrates a
virtualized embodiment of the network node 400 according
to some embodiments of the present disclosure. Again,
optional features are represented by dashed boxes. As used
herein, a "virtualized" network node is an implementation of
the network node 400 in which at least a portion of the
functionality of the network node 400 is implemented as a
virtual component(s) (e.g., via a virtual machine(s) execut-
ing on a physical processing node(s) in a network(s)). As
illustrated, in this example, if the network node 400 is a
radio access node, the network node 400 may include the
control system 402 and/or the one or more radio units 410,
as described above. The control system 402 may be con-
nected to the radio unit(s) 410 via, for example, an optical
cable or the like. The network node 400 includes one or
more processing nodes 500 coupled to or included as part of
a network(s) 502. If present, the control system 402 or the
radio unit(s) are connected to the processing node(s) 500 via
the network 502. Each processing node 500 includes one or
more processors 504 (e.g., CPUs, ASICs, FPGAs, and/or the
like), memory 506, and a network interface 508.

In this example, functions 510 of the network node 400
described herein (e.g., one or more functions of a base
station 102 or gNB described herein) are implemented at the
one or more processing nodes 500 or distributed across the
one or more processing nodes 500 and the control system
402 and/or the radio unit(s) 410 in any desired manner. In
some particular embodiments, some or all of the functions
510 of the network node 400 described herein are imple-
mented as virtual components executed by one or more
virtual machines implemented in a virtual environment(s)
hosted by the processing node(s) 500. As will be appreciated
by one of ordinary skill in the art, additional signaling or
communication between the processing node(s) 500 and the
control system 402 is used in order to carry out at least some
of the desired functions 510. Notably, in some embodiments,
the control system 402 may not be included, in which case
the radio unit(s) 410 communicate directly with the pro-
cessing node(s) 500 via an appropriate network interface(s).

In some embodiments, a computer program including instructions which, when executed by at least one processor, causes the at least one processor to carry out the functionality of the network node 400 or a node (e.g., a processing node 500) implementing one or more of the functions 510 of the network node 400 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
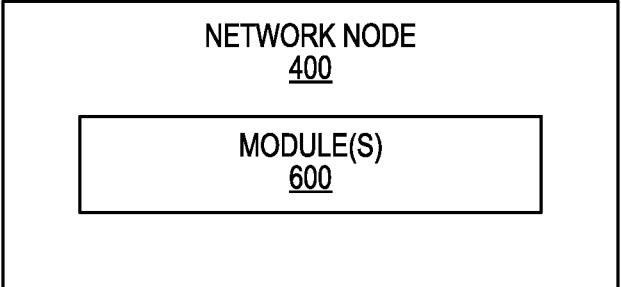

FIG. 6 is a schematic block diagram of the network node 400 according to some other embodiments of the present disclosure. The network node 400 includes one or more modules 600, each of which is implemented in software. The module(s) 600 provide the functionality of the network node 400 described herein. This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
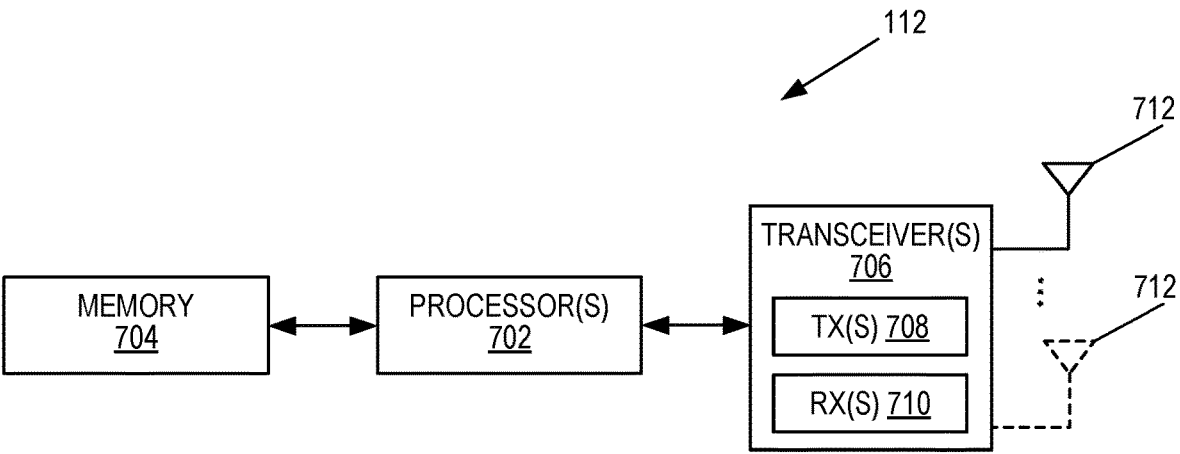
FIGS. 7 and 8 are schematic block diagrams of a wireless communication device (e.g., a UE) according to some embodiments of the present disclosure.

FIG. 7 is a schematic block diagram of a wireless communication device 112 (e.g., a UE) according to some embodiments of the present disclosure. As illustrated, the wireless communication device 112 includes one or more processors 702 (e.g., CPUs, ASICs, FPGAS, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the wireless communication device 112 (or UE) described above may be fully or partially implemented in software that is, e.g., stored in the memory 704 and executed by the processor(s) 702. Note that the wireless communication device 112 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the wireless communication device 112 and/or allowing output of information from the wireless communication device 112), a power supply (e.g., a battery and associated power circuitry), etc.

In some embodiments, a computer program including instructions which, when executed by at least one processor, causes the at least one processor to carry out the functionality of the wireless communication device 112 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
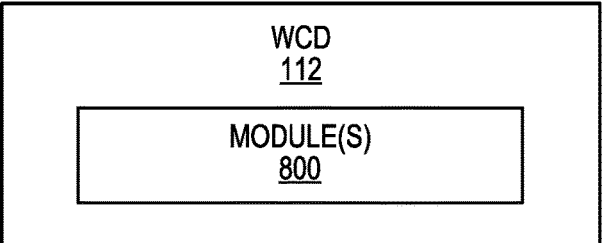

FIG. 8 is a schematic block diagram of the wireless communication device 112 according to some other embodiments of the present disclosure. The wireless communication device 112 includes one or more modules 800, each of which is implemented in software. The module(s) 800 provide the functionality of the wireless communication device 112 (or UE) described herein.

Figure 9:
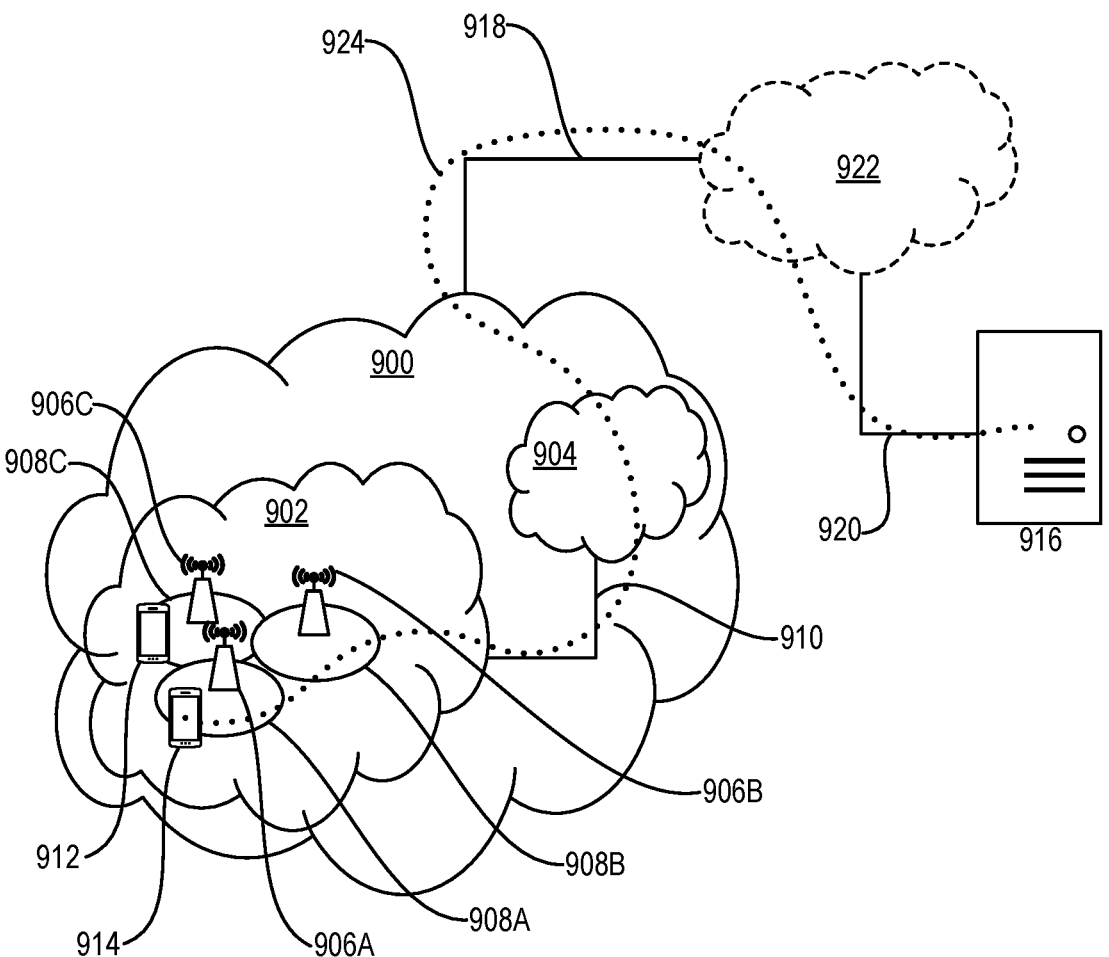
FIG. 9 illustrates a telecommunication network connected via an intermediate network to a host computer in accordance with some embodiments of the present disclosure.

With reference to FIG. 9, in accordance with an embodiment, a communication system includes a telecommunication network 900, such as a 3GPP-type cellular network, which comprises an access network 902, such as a RAN, and a core network 904. The access network 902 comprises a plurality of base stations 906A, 906B, 906C, such as Node Bs, eNBs, gNBs, or other types of wireless Access Points (APs), each defining a corresponding coverage area 908A, 908B, 908C. Each base station 906A, 906B, 906C is connectable to the core network 904 over a wired or wireless connection 910. A first UE 912 located in coverage area 908C is configured to wirelessly connect to, or be paged by, the corresponding base station 906C. A second UE 914 in coverage area 908A is wirelessly connectable to the corresponding base station 906A. While a plurality of UEs 912, 914 are illustrated in this example, the disclosed embodiments are equally applicable to a situation where a sole UE is in the coverage area or where a sole UE is connecting to the corresponding base station 906.

The telecommunication network 900 is itself connected to a host computer 916, which may be embodied in the hardware and/or software of a standalone server, a cloud-implemented server, a distributed server, or as processing resources in a server farm. The host computer 916 may be under the ownership or control of a service provider, or may be operated by the service provider or on behalf of the service provider. Connections 918 and 920 between the telecommunication network 900 and the host computer 916 may extend directly from the core network 904 to the host computer 916 or may go via an optional intermediate network 922. The intermediate network 922 may be one of, or a combination of more than one of, a public, private, or hosted network; the intermediate network 922, if any, may be a backbone network or the Internet; in particular, the intermediate network 922 may comprise two or more subnetworks (not shown).

The communication system of FIG. 9 as a whole enables connectivity between the connected UEs 912, 914 and the host computer 916. The connectivity may be described as an Over-the-Top (OTT) connection 924. The host computer 916 and the connected UEs 912, 914 are configured to communicate data and/or signaling via the OTT connection 924, using the access network 902, the core network 904, any intermediate network 922, and possible further infrastructure (not shown) as intermediaries. The OTT connection 924 may be transparent in the sense that the participating communication devices through which the OTT connection 924 passes are unaware of routing of uplink and downlink communications. For example, the base station 906 may not or need not be informed about the past routing of an incoming downlink communication with data originating from the host computer 916 to be forwarded (e.g., handed over) to a connected UE 912. Similarly, the base station 906 need not be aware of the future routing of an outgoing uplink communication originating from the UE 912 towards the host computer 916.

Example implementations, in accordance with an embodiment, of the UE, base station, and host computer discussed in the preceding paragraphs will now be described with reference to FIG. 10. In a communication system 1000, a host computer 1002 comprises hardware 1004 including a communication interface 1006 configured to set up and maintain a wired or wireless connection with an interface of a different communication device of the communication system 1000. The host computer 1002 further comprises processing circuitry 1008, which may have storage and/or processing capabilities. In particular, the processing circuitry 1008 may comprise one or more programmable processors, ASICs, FPGAs, or combinations of these (not shown) adapted to execute instructions. The host computer 1002 further comprises software 1010, which is stored in or accessible by the host computer 1002 and executable by the processing circuitry 1008. The software 1010 includes a host application 1012. The host application 1012 may be operable to provide a service to a remote user, such as a UE 1014 connecting via an OTT connection 1016 terminating at the UE 1014 and the host computer 1002. In providing the service to the remote user, the host application 1012 may provide user data which is transmitted using the OTT connection 1016.

The communication system 1000 further includes a base station 1018 provided in a telecommunication system and comprising hardware 1020 enabling it to communicate with the host computer 1002 and with the UE 1014. The hardware 1020 may include a communication interface 1022 for setting up and maintaining a wired or wireless connection with an interface of a different communication device of the communication system 1000, as well as a radio interface 1024 for setting up and maintaining at least a wireless connection 1026 with the UE 1014 located in a coverage area (not shown in FIG. 10) served by the base station 1018. The communication interface 1022 may be configured to facilitate a connection 1028 to the host computer 1002. The connection 1028 may be direct or it may pass through a core network (not shown in FIG. 10) of the telecommunication system and/or through one or more intermediate networks outside the telecommunication system. In the embodiment shown, the hardware 1020 of the base station 1018 further includes processing circuitry 1030, which may comprise one or more programmable processors, ASICs, FPGAs, or combinations of these (not shown) adapted to execute instructions. The base station 1018 further has software 1032 stored internally or accessible via an external connection.

The communication system 1000 further includes the UE 1014 already referred to. The UE's 1014 hardware 1034 may include a radio interface 1036 configured to set up and maintain a wireless connection 1026 with a base station serving a coverage area in which the UE 1014 is currently located. The hardware 1034 of the UE 1014 further includes processing circuitry 1038, which may comprise one or more programmable processors, ASICs, FPGAs, or combinations of these (not shown) adapted to execute instructions. The UE 1014 further comprises software 1040, which is stored in or accessible by the UE 1014 and executable by the processing circuitry 1038. The software 1040 includes a client application 1042. The client application 1042 may be operable to provide a service to a human or non-human user via the UE 1014, with the support of the host computer 1002. In the host computer 1002, the executing host application 1012 may communicate with the executing client application 1042 via the OTT connection 1016 terminating at the UE 1014 and the host computer 1002. In providing the service to the user, the client application 1042 may receive request data from the host application 1012 and provide user data in response to the request data. The OTT connection 1016 may transfer both the request data and the user data. The client application 1042 may interact with the user to generate the user data that it provides.

Figure 10:
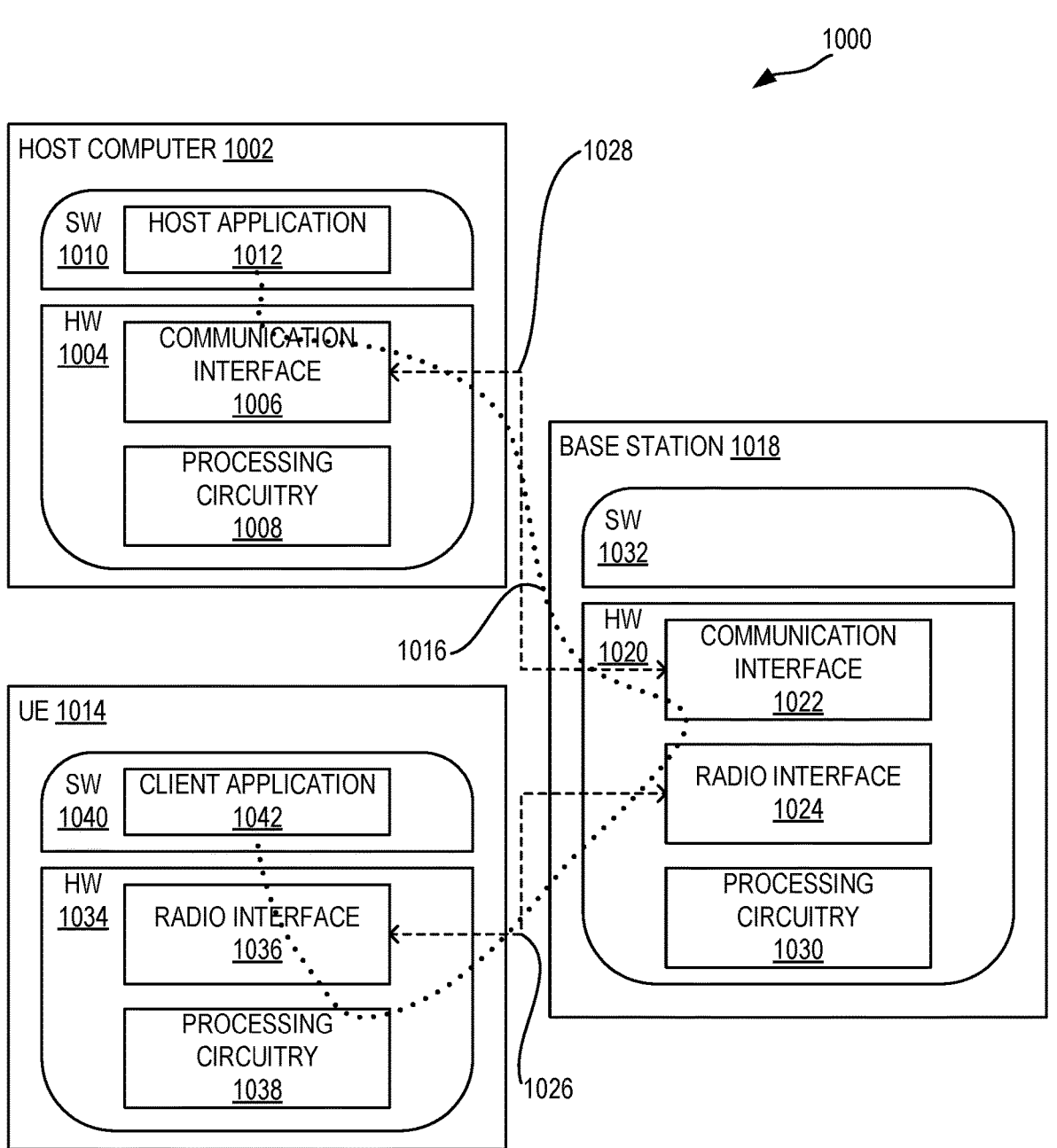
FIG. 10 is a generalized block diagram of a host computer communicating via a base station with a UE over a partially wireless connection in accordance with some embodiments of the present disclosure.

It is noted that the host computer 1002, the base station 1018, and the UE 1014 illustrated in FIG. 10 may be similar or identical to the host computer 916, one of the base stations 906A, 906B, 906C, and one of the UEs 912, 914 of FIG. 9, respectively. This is to say, the inner workings of these entities may be as shown in FIG. 10 and independently, the surrounding network topology may be that of FIG. 9.

In FIG. 10, the OTT connection 1016 has been drawn abstractly to illustrate the communication between the host computer 1002 and the UE 1014 via the base station 1018 without explicit reference to any intermediary devices and the precise routing of messages via these devices. The network infrastructure may determine the routing, which may be configured to hide from the UE 1014 or from the service provider operating the host computer 1002, or both. While the OTT connection 1016 is active, the network infrastructure may further take decisions by which it dynamically changes the routing (e.g., on the basis of load balancing consideration or reconfiguration of the network).

The wireless connection 1026 between the UE 1014 and the base station 1018 is in accordance with the teachings of the embodiments described throughout this disclosure. One or more of the various embodiments improve the performance of OTT services provided to the UE 1014 using the OTT connection 1016, in which the wireless connection 1026 forms the last segment.

A measurement procedure may be provided for the purpose of monitoring data rate, latency, and other factors on which the one or more embodiments improve. There may further be an optional network functionality for reconfiguring the OTT connection 1016 between the host computer 1002 and the UE 1014, in response to variations in the measurement results. The measurement procedure and/or the network functionality for reconfiguring the OTT connection 1016 may be implemented in the software 1010 and the hardware 1004 of the host computer 1002 or in the software 1040 and the hardware 1034 of the UE 1014, or both. In some embodiments, sensors (not shown) may be deployed in or in association with communication devices through which the OTT connection 1016 passes; the sensors may participate in the measurement procedure by supplying values of the monitored quantities exemplified above, or supplying values of other physical quantities from which the software 1010, 1040 may compute or estimate the monitored quantities. The reconfiguring of the OTT connection 1016 may include message format, retransmission settings, preferred routing, etc.; the reconfiguring need not affect the base station 1018, and it may be unknown or imperceptible to the base station 1018. Such procedures and functionalities may be known and practiced in the art. In certain embodiments, measurements may involve proprietary UE signaling facilitating the host computer's 1002 measurements of throughput, propagation times, latency, and the like. The measurements may be implemented in that the software 1010 and 1040 causes messages to be transmitted, in particular empty or 'dummy' messages, using the OTT connection 1016 while it monitors propagation times, errors, etc.

Figures 11, 12:
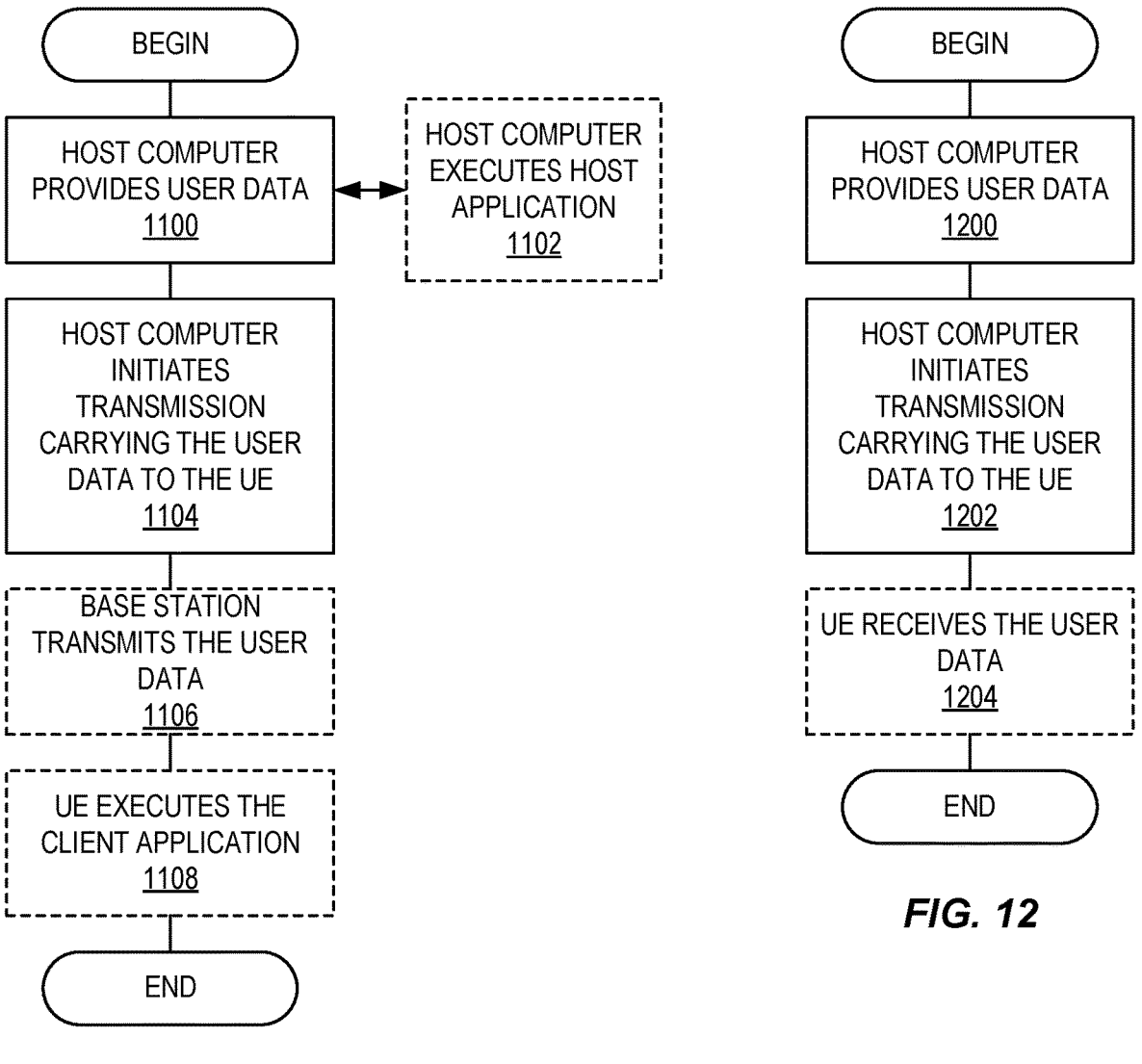
FIGS. 11, 12, 13, and 14 are flowcharts illustrating methods implemented in a communication system in accordance with embodiments of the present disclosure.

FIG. 11 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 11 will be included in this section. In step 1100, the host computer provides user data. In sub-step 1102 (which may be optional) of step 1100, the host computer provides the user data by executing a host application. In step 1104, the host computer initiates a transmission carrying the user data to the UE. In step 1106 (which may be optional), the base station transmits to the UE the user data which was carried in the transmission that the host computer initiated, in accordance with the teachings of the embodiments described throughout this disclosure. In step 1108 (which may also be optional), the UE executes a client application associated with the host application executed by the host computer.

FIG. 12 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 12 will be included in this section. In step 1200 of the method, the host computer provides user data. In an optional sub-step (not shown) the host computer provides the user data by executing a host application. In step 1202, the host computer initiates a transmission carrying the user data to the UE. The transmission may pass via the base station, in accordance with the teachings of the embodiments described throughout this disclosure. In step 1204 (which may be optional), the UE receives the user data carried in the transmission.

Figures 13, 14:
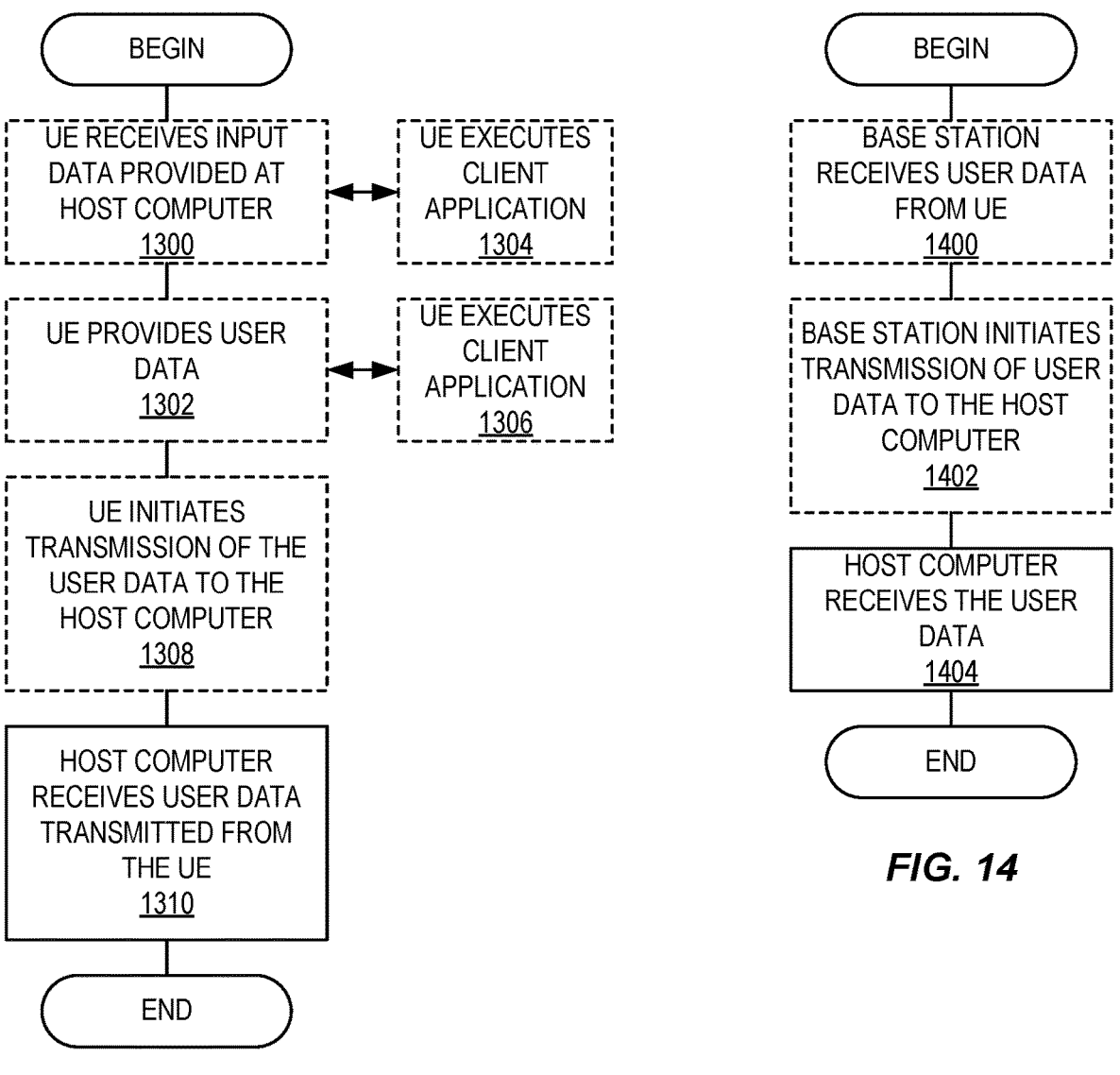

FIG. 13 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 13 will be included in this section. In step 1300 (which may be optional), the UE receives input data provided by the host computer. Additionally or alternatively, in step 1302, the UE provides user data. In sub-step 1304 (which may be optional) of step 1300, the UE provides the user data by executing a client application. In sub-step 1306 (which may be optional) of step 1302, the UE executes a client application which provides the user data in reaction to the received input data provided by the host computer. In providing the user data, the executed client application may further consider user input received from the user. Regardless of the specific manner in which the user data was provided, the UE initiates, in sub-step 1308 (which may be optional), transmission of the user data to the host computer. In step 1310 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station, and a UE which may be those described with reference to FIGS. 9 and 10. For simplicity of the present disclosure, only drawing references to FIG. 14 will be included in this section. In step 1400 (which may be optional), in accordance with the teachings of the embodiments described throughout this disclosure, the base station receives user data from the UE. In step 1402 (which may be optional), the base station initiates transmission of the received user data to the host computer. In step 1404 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A method performed by a wireless communication device, the method comprising:

determining transmit power for a transport block over multiple slots (TBoMS) uplink transmission per TBoMS transmission occasion, wherein one TBoMS transmission occasion of the TBoMS uplink transmission is defined by an index $$n_{s,f}^{\mu}$$

of a first slot of the TBoMS transmission occasion with system frame number "SFN", a first symbol S within the first slot of the TBoMS transmission occasion, and a number of consecutive symbols L of the TBoMS uplink transmission in the first slot or a number of total symbols L of the TBoMS uplink transmission in the transmission occasion; and transmitting the TBoMS uplink transmission in accordance with the transmit power.

2. The method of claim 1 wherein one TBoMS transmission occasion of the TBoMS uplink transmission spans two or more consecutive slots of the TBoMS uplink transmission.

3. The method of claim 1 wherein one TBoMS transmission occasion of the TBoMS uplink transmission spans two or more consecutive or non-consecutive slots of the TBoMS uplink transmission.

4. The method of claim 3 wherein one TBoMS transmission occasion of the TBoMS uplink transmission is defined by an index $$n_{s,f}^{\mu}$$

of a first slot of the TBoMS transmission occasion with system frame number "SFN", a first symbol S within the first slot, and a number of symbols L of the TBoMS uplink transmission either in the first slot or across multiple slots of the TBoMS uplink transmission.

5. The method of claim 1 wherein whether or not a change of transmit power is allowed during the TBoMS uplink transmission is either configured by a network node or predetermined.

6. The method of claim 5 wherein the transmit power changes between TBoMS transmission occasions for the TBoMS uplink transmission based on one or parameters.

7. The method of claim 6 wherein the one or more parameters comprise: (a) data-to-Demodulation Reference Signal, DMRS, ratio in each slot, (b) group common Transmit Power Control, TPC, command, (c) reference signal, (d) pathloss estimation, (e) PUSCH power control adjustment state, or (f) any combination of two or more of (a)-(e).

8. The method of claim 1 wherein a same transmit power is configured or predetermined across the multiple slots of the TBoMS uplink transmission, and the wireless communication device determines the transmit power prior to transmission based on a transmit power in a first slot and keeps the transmit power the same until an end of the TBoMS uplink transmission.

9. The method of claim 8 wherein:

the wireless communication device does not expect to receive a TPC command for the TBoMS uplink transmission during the TBoMS uplink transmission; and/or if the wireless communication device receives a TPC command for the TBoMS uplink transmission during the TBoMS uplink transmission:

the wireless communication device discards the TPC command, or the wireless communication device applies the TPC command in a next transmission after the TBoMS uplink transmission; and/or the wireless communication device does not expect a respective base station to change a reference signal and its transmission power, which the wireless communication device uses to estimate downlink pathloss during the TBoMS uplink transmission; and/or the wireless communication device does not perform downlink pathloss measurement from the physical layer during the TBoMS uplink transmission; and/or the wireless communication device does not expect PUSCH power control adjustment state l to be changed by RRC or DCI signaling during the TBoMS uplink transmission.

10. The method of claim 1 wherein determining the transmit power for the TBoMS uplink transmission per TBoMS transmission occasion comprises calculating one or more TBoMS transmission occasion related parameters.

11. The method of claim 10 wherein the one or more TBoMS transmission occasion related parameters comprise: (I) MCS related parameter $\Delta_{TF,b,f,c}(i)$, (II) BPRE, (III) PUSCH power control adjustment state $f_{b,f,c}(i,l)$ for active UL BWP b of carrier f of serving cell c in PUSCH transmission occasion i, or (IV) a combination of any two or more of (I)-(III).

12. The method of claim 10 wherein the one or more TBoMS transmission occasion related parameters comprise BPRE.

13. The method of claim 12 wherein the BPRE is BRE for multi-slot PUSCH with UL-SCH calculated cross the multiple slots of the TBoMS as:

$$BPRE = \sum_{r=0}^{C-1} \frac{K_r}{N_{RE}}$$

where $N_{RE}$ is a number of resource elements across the multiple slots of a TBoMS, determined as $$N_{RE} = \sum_{i=0}^{N-1} \left( M_{RB,b,f,c}^{PUSCH}(i) \cdot \sum_{j=0}^{N_{symb,b,f,c}^{PUSCH}(i)-1} N_{sc,data}^{RB}(i, j) \right),$$

where N is the total number of transmission occasions of the TBoMS, $$N_{symb,b,f,c}^{PUSCH}(i)$$

is a number of symbols for PUSCH transmission occasion i on active UL BWP b of carrier f of serving cell c, $$N_{sc,data}^{RB}(i, j)$$

is a number of subcarriers excluding DM-RS subcarriers and phase-tracking RS samples in PUSCH symbol j, $$0 \le j < N_{symb,b,f,c}^{PUSCH}(i).$$

14. The method of claim 12 wherein the BPRE is BRE for multi-slot PUSCH with UL-SCH calculated cross the multiple slots of the TBoMS as:

$$BPRE = \sum_{r=0}^{C-1} \frac{K_r}{[(N)]_{RE} * N)}$$

where $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j), \text{ where } i = 0, N_{symb,b,f,c}^{PUSCH}(i)$$

is a number of symbols for the first transmission occasion of the TBoMS on active UL BWP b of carrier f of serving cell c, $$N_{sc,data}^{RB}(i, j)$$

(i,j) is a number of subcarriers excluding DM-RS subcarriers and phase-tracking RS samples [TS 38.211] in PUSCH symbol j and assuming no segmentation for a nominal repetition in case the PUSCH transmission is with repetition Type B, $$0 \le j < N_{symb,b,f,c}^{PUSCH}(i),$$

N is the total number of transmission occasions of the TBoMS.

15. The method of claim 1 wherein TPC accumulation is disabled, an absolute power offset value is used for power adjustment, and determining the transmit power for the TBoMS uplink transmission per TBoMS transmission occasion comprises determining the absolute power adjustment in each slot of the TBoMS uplink transmission.

16. The method of claim 15 wherein the absolute power adjustment is determined by a latest TPC command received before:

the start of a first slot for the TBoMS uplink transmission, or the start of a first scheduled symbol of the first slot for the TBoMS uplink transmission, or the start of a set of symbols or slots before the first slot for the TBoMS uplink transmission.

17. The method of claim 15 wherein multiple TBoMS transmission occasions are used for power calculation for the TBoMS uplink transmission, and the absolute power adjustment for determining the transmit power in one TBoMS transmission occasion is determined by the latest TPC command received before:

the start of a first slot of the TBoMS transmission occasion, or the start of a first symbol of the first slot of the TBoMS transmission occasion, or the start of a set of symbols or slots before the first slot of the TBoMS transmission occasion.

18. The method of claim 1 wherein TPC accumulation is enabled, an accumulation power offset value is used for power adjustment, and determining the transmit power for the TBoMS uplink transmission per TBoMS transmission occasion comprises determining the accumulation power adjustment in a TBoMS transmission occasion of the TBoMS uplink transmission based on a set of TPC command received between $K_{PUSCH}(i-i_0)-1$ symbols before TBoMS transmission occasion $i-i_0$ and $K_{PUSCH}(i)$ symbols before TBoMS transmission occasion $i$ on active uplink bandwidth part b of carrier f of serving cell c for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i.

19. The method of claim 18 wherein if a PUSCH transmission is scheduled by a Downlink Control Information, DCI, format, $K_{PUSCH}(i)$ is a number of symbols for active uplink bandwidth part b of carrier f of serving cell c after a last symbol of a corresponding Physical Downlink Control Channel, PDCCH, reception and before a first symbol of the first slot of the current PUSCH occasion i of TBoMS transmission.

20. A method performed by a wireless communication device, the method comprising:

determining transmit power for a transport block over multiple slots (TBoMS) uplink transmission per TBoMS transmission occasion; and transmitting the TBoMS uplink transmission in accordance with the transmit power, wherein:

one TBoMS transmission occasion spans two or more slots and determining the transmit power for the TBoMS uplink transmission per TBoMS transmission occasion comprises either:

determining a transmit power for a TBoMS transmission occasion that is equivalent to a transmit power determined for a first slot of the TBoMS transmission occasion, where the same transmit power is kept until an end of the TBoMS transmission occasion, or determining a transmit power for a TBoMS transmission occasion considering the two or more slots of the TBoMS transmission occasion as a whole, and a particular parameter is different for at least two of the two or more slots of the TBoMS transmission occasion, and determining the transmit power for the TBoMS transmission occasion comprises determining the transmit power for the TBoMS transmission occasion based on the particular parameter for a fixed one or more of the two or more slots of the TBoMS transmission occasion.

21. A wireless communication device-comprising:

one or more transmitters;

one or more receivers; and processing circuitry associated with the one or more transmitters and the one or more receivers, the processing circuitry configured to cause the wireless communication device to:

determine transmit power for a transport block over multiple slots (TBoMS) uplink transmission per TBoMS transmission occasion, wherein one TBoMS transmission occasion of the TBoMS uplink transmission is defined by an index $$n_{s,f}^{\mu}$$

of a first slot of the TBoMS transmission occasion with system frame number "SFN", a first symbol S within the first slot of the TBoMS transmission occasion, and a number of consecutive symbols L of the TBoMS uplink transmission in the first slot or a number of total symbols L of the TBoMS uplink transmission in the transmission occasion; and transmit the TBoMS uplink transmission in accordance with the transmit power.

* * * * *